(12) United States Patent
Nakasho et al.

(10) Patent No.: US 7,456,605 B2
(45) Date of Patent: Nov. 25, 2008

(54) BATTERY CHARGER HAVING TEMPERATURE DETECTION PORTION FOR DETECTING BATTERY TEMPERATURE

(75) Inventors: Toshiki Nakasho, Sumoto (JP); Eiji Satsuma, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/212,584

(22) Filed: Aug. 29, 2005

(65) Prior Publication Data

US 2006/0043926 A1 Mar. 2, 2006

(30) Foreign Application Priority Data

Aug. 31, 2004 (JP) ............................. 2004-253025

(51) Int. Cl.
 *H02J 7/00* (2006.01)
(52) U.S. Cl. .................. 320/107; 320/110; 320/150
(58) Field of Classification Search ................ 320/110, 320/112, 150, 153, 154
 See application file for complete search history.

(56) References Cited

U.S. PATENT DOCUMENTS

| 4,816,737 | A | | 3/1989 | Delmas et al. |
| 5,248,927 | A | * | 9/1993 | Takei et al. ................. 320/113 |
| 5,290,643 | A | * | 3/1994 | Chen ............................ 429/61 |
| 5,592,065 | A | | 1/1997 | Oglesbee et al. |
| 6,577,101 | B1 | * | 6/2003 | Takeshita et al. ............ 320/112 |
| 2002/0167295 | A1 | | 11/2002 | Yamashita |
| 2004/0035245 | A1 | * | 2/2004 | Albert et al. ............... 74/606 A |
| 2005/0046393 | A1 | * | 3/2005 | Nakasho et al. ............. 320/150 |
| 2005/0099163 | A1 | * | 5/2005 | Liepold ....................... 320/150 |
| 2006/0028183 | A1 | * | 2/2006 | Izawa et al. ................. 320/150 |

FOREIGN PATENT DOCUMENTS

| JP | 5-30669 | 2/1993 |
| JP | 2002-199609 | 7/2002 |
| JP | 2002-199611 | 7/2002 |

* cited by examiner

*Primary Examiner*—Akm E Ullah
*Assistant Examiner*—Arun Williams
(74) *Attorney, Agent, or Firm*—Wenderoth, Lind & Ponack, L.L.P.

(57) ABSTRACT

A battery charger includes a temperature detection portion that comes in contact with a battery detachably mounted in a battery pocket and detects its battery temperature, and a charge circuit that controls charge of the battery based on the battery temperature detected by the temperature detection portion. The temperature detection portion includes a heat conduction plate and a temperature sensor. The heat conduction plate includes a pair of upper and lower sandwich plates that sandwich the temperature sensor, and an elastic connection arm that connects the upper and lower sandwich plates at a first end side, and an interlock portion that couples the upper and lower sandwich plates at a second end side opposite to the first end side. The elastic connection arm connects first ends of the upper and lower sandwich plates, and the interlock portion couples second ends of the upper and lower sandwich plates. Thus, the upper and lower sandwich plates sandwich and fasten the temperature sensor.

11 Claims, 23 Drawing Sheets

BATTERY CHARGER HAVING TEMPERATURE DETECTION PORTION FOR DETECTING BATTERY TEMPERATURE

BACKGROUND OF THE INVENTION

1. Field of the Invention

The present invention relates to a charger that charges a battery to be charged while detecting a temperature of the battery.

2. Description of the Related Art

When a battery is charged, its temperature rises. Particularly, when the battery is close to full charge, its temperature sharply rises. A rise of battery temperature causes deterioration of battery characteristics. In order to prevent deterioration of battery performance, a charger that has a temperature sensor for detecting a battery temperature has been developed (see Japanese Patent Laid-Open Publication TOKUKAI No. 2002-199609 and Japanese Patent Laid-Open Publication TOKUKAI No. HEI 5-30669).

In the charger disclosed in Japanese Patent Laid-Open Publication TOKUKAI No. 2002-199609, a temperature sensor that is inserted in a soft tube is in contact with a surface of a battery pack. The temperature sensor is in thermal contact with the surface of battery through the soft tube and detects its battery temperature. In the charger disclosed in Japanese Patent Laid-Open Publication TOKUKAI No. HEI 5-30669, a temperature sensor is pressed by a coil spring and is thermally coupled to a thermally conductive member of the battery pack. The temperature sensor detects its battery temperature through the thermally conductive member.

SUMMARY OF THE INVENTION

The chargers disclosed in these publications detect the battery temperatures by the temperature sensors, and thus cut off charge currents when detecting that the battery temperatures are higher than predetermined temperatures, for example. It is difficult for a charger of these types of structures to accurately detect a battery temperature. Even if a temperature sensor is in direct contact with a battery, its battery temperature cannot be always accurately detected. FIG. 1 shows a structure that has been studied by the applicant. In the case where a temperature sensor 4 with a temperature detection element 4A is pressed so as to be in direct contact with a surface of a battery 2, since cool air flows into a gap between the battery 2 and the temperature sensor 4 as shown by arrows in the figure, the battery temperature cannot be accurately detected with the temperature sensor 4 due to a cooling effect of this air flow. In addition, FIG. 2 shows a structure that has been further studied by the applicant. In the structure, a metal plate 50 absorbs heat of a battery 2, and conveys the absorbed heat to a temperature sensor 4. In this structure, in the case where batteries are repeatedly attached to and removed from the charger to be charged, a gap (not shown) appears between the battery 2 and the metal plate 50, thus, it is difficult to properly detect the temperature of the battery 2. Additionally, although heat of the battery 2 can be conveyed to the metal plate 50, the metal plate 50 is cooled by air as shown by arrows in the figure. For this reason, even this structure cannot provide accurate detection of battery temperature. As mentioned above, the battery temperature cannot be accurately detected in the structure where the temperature sensor is in direct contact with the battery nor the structure where the temperature sensor is in thermal contact with the battery through the metal plate. In addition, it is more difficult to accurately detect the battery temperature in real time without time delay. A microcomputer installed in a charger can correct a time delay of detection to some extent based on a detected temperature. However, the microcomputer cannot provide a highly accurate correction for a sharp temperature rise at the end of charge nor environmental temperature variation due to repeated charging. The reason is that behaviors of temperature sensor and battery temperature curve are not the same, and thus, the temperature sensor cannot respond to sharp variations of battery temperature. If a temperature slope is large, the difference between a temperature detected by the temperature sensor and the battery temperature is large. As a result, it is more difficult to accurately detect the battery temperature.

In a charger that has a circuit for detecting a battery temperature as a protection function, accuracy requirement of temperature detection is not so high. On the other hand, in a charger that detects a battery temperature and controls an average charge current based on the battery temperature, and thus controls the average charge current so as to always keep the battery temperature constant, it is important to detect the battery temperature with a very high degree of accuracy.

Furthermore, a charger that has a structure shown in FIGS. 3 and 4 as a structure for detecting a temperature of a battery to be charged is available on the market. In this structure, a case 51 is provided with a battery pocket 52 that has a bottom 53 of a battery pocket 52 with a shape along the cylindrical battery 2, and the temperature sensor 4 is located under a surface of a convex part of the bottom 53. The temperature sensor 4 is inserted into a recessed part 54 located under the surface of the convex part. In this structure, heat from the battery 2 is conveyed to the temperature sensor 4 through a path shown by arrows. The path of the heat is shown as follows.

(1) heat conduction of the battery itself, (2) heat conduction from the battery through an air layer to the case, (3) heat conduction of the case, and (4) heat conduction from the case through an air layer to the temperature sensor.

In this structure, since the path of heat conduction from the battery to the temperature sensor is long, and the bottom of the case is cooled by air, the temperature difference between the battery and the temperature sensor is large. In addition, when the battery temperature rises, it takes a long time until the sensor reaches the same temperature as the battery. Accordingly, a defect that the battery temperature cannot be accurately detected without time delay cannot be solved.

Therefore, the present invention has been developed for solving the disadvantages in the prior art. It is an important object to provide a charger capable of charging a battery in ideal temperature conditions while detecting its battery temperature with high accuracy and with a small time delay by a temperature sensor.

A charger according to the present invention comprises a case with a battery pocket that can detachably mount a battery to be charged, a temperature detection portion that comes in contact with the battery mounted to the battery pocket and detects its battery temperature, and a charge circuit that controls charge of the battery based on the battery temperature detected by the temperature detection portion. The temperature detection portion includes a heat conduction plate and a temperature sensor that is fastened to the heat conduction plate. The heat conduction plate includes a pair of upper and lower sandwich plates that sandwich the temperature sensor, and an elastic connection arm that connects the upper and lower sandwich plates at a first end side, and an interlock portion that is located at a second end side opposite to the first end side and couples the upper and lower sandwich plates sandwiching the temperature sensor. The elastic connection arm connects first ends of the upper and lower sandwich plates, and the interlock portion couples second ends of the upper and lower sandwich plates, and thus, the upper and lower sandwich plates sandwich and fasten the temperature sensor. The temperature detection portion detects the battery temperature by the temperature sensor that is fastened to the sandwich plates of the heat conduction plate.

The aforementioned charger has a feature that can charge a battery in ideal temperature conditions while detecting battery temperature with high accuracy and with a small time delay by a temperature sensor. The reason is that, in the charger according to the present invention, the temperature detection portion that comes in contact with the battery mounted to the battery pocket and detects its battery temperature includes the heat conduction plate and the temperature sensor, and the heat conduction plate has a characteristic structure that fastens the temperature sensor to the heat conduction plate. The heat conduction plate includes the pair of upper and lower sandwich plates that sandwich the temperature sensor, and the elastic connection arm connects first ends of the upper and lower sandwich plates, and the interlock portion couples second ends of the upper and lower sandwich plates, and thus, the upper and lower sandwich plates sandwich and fasten the temperature sensor. Since, in the temperature detection portion of this structure, the sandwich plates sandwich and fasten the temperature sensor, heat generated in the battery can be conveyed from the heat conduction plate to the temperature sensor. Accordingly, it is possible to accurately and quickly detect the battery temperature. Consequently, the charger according the present invention can control battery charge in an ideal manner while detecting the temperature of the battery mounted to the battery pocket with high accuracy and with a small time delay by the temperature sensor.

The temperature sensor may include a temperature detection element that is fastened to a flexible substrate. The heat conduction plate of the temperature detection portion may be an elastically deformable metal plate, and have an elastic leg that elastically presses the sandwich plates toward a battery surface. One of the sandwich plates of the heat conduction plate may have a pair of the elastic legs that are connected to its both sides.

In the charger including the heat conduction plate of the temperature detection portion that is the elastically deformable metal plate and has the elastic leg that elastically presses the sandwich plates toward the battery surface as mentioned above, an elastic force of the elastic leg can press the sandwich plate to bring it in firm contact with the battery surface. The temperature detection portion that allows the sandwich plate to come in firm contact with the battery surface has a feature that can more accurately detect the battery temperature. Particularly, in the charger including one of the sandwich plates having the pair of elastic legs that are connected to its both sides, the sandwich plate can be pressed in a good balance, thus, it is possible to bring the sandwich plate in contact with the battery surface in an ideal manner. Furthermore, the charger according to the present invention may further comprise a fastener plate that is connected to the elastic legs. In this construction, the fastener plate has a pair of penetrating holes that can pass the pair of elastic legs into or out from them, and the pair of elastic legs tilt so as to move gradually away from or closer to each other as they extend upwardly from the penetrating holes.

This charger has a very simple structure but can elastically press the sandwich plate toward the battery surface with the elasticity of the elastic legs.

The upper sandwich plate of the heat conduction plate may have the interlock portion that interlocks with the lower sandwich plate. In addition, the lower sandwich plate of the heat conduction plate may be provided with protrusion strips that upwardly protrude at its both sides, and the upper sandwich plate may be located between the protrusion strips. Additionally, the upper sandwich plate of the heat conduction plate may have the interlock portions that interlock with the inner surfaces of the protrusion strips of the lower sandwich plate at both sides of the upper sandwich plate.

In the charger including the lower sandwich plate provided with the protrusion strips that upwardly protrude at both sides, and the upper sandwich plate located between the protrusion strips as mentioned above, the temperature sensor can be located at its accurate position, and the upper and lower sandwich plates can ensure sandwiching and fastening of the temperature sensor.

Moreover, in the charger including the upper sandwich plate having the interlock portions that interlock with the inner surfaces of the protrusion strips of the lower sandwich plate at both sides of the upper sandwich plate, the protrusion strips provided on the lower sandwich plate serve as a member that interlocks with the upper plate, and additionally couple both sides of the upper sandwich plate to the lower sandwich plate to ensure coupling of the upper and lower sandwich plates.

The above and further objects and features of the invention will more fully be apparent from the following detailed description with accompanying drawings.

DETAILED DESCRIPTION OF THE PREFERRED EMBODIMENTS

Figure 1:
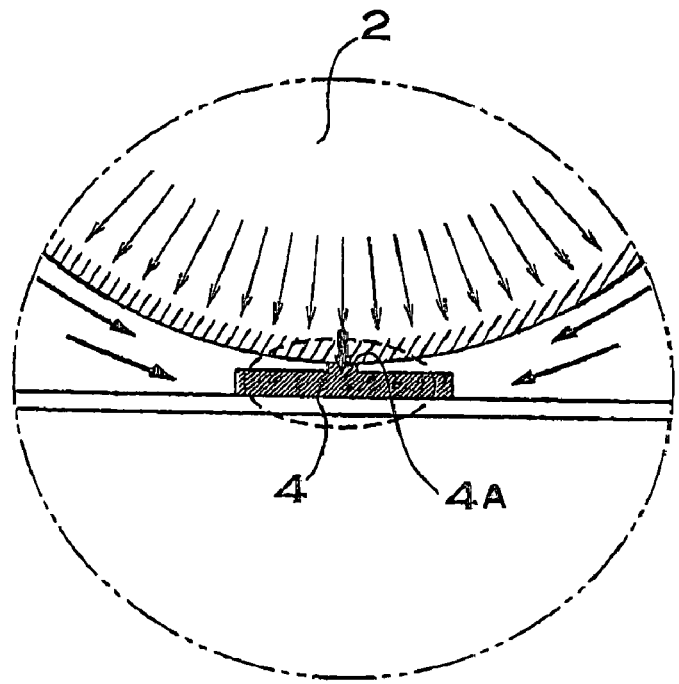
FIG. 1 is a cross-sectional view showing a state where a battery temperature is detected by a structure that has been studied by the applicant.
Figure 2:
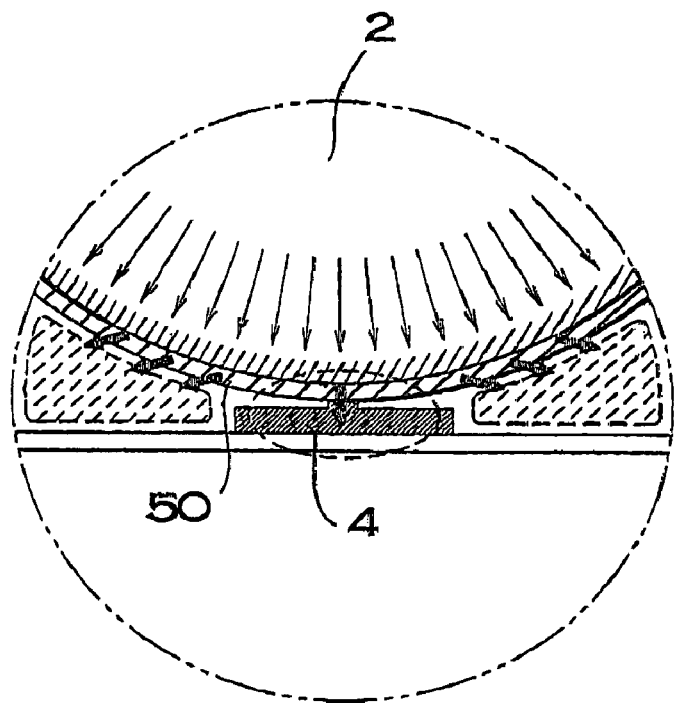
FIG. 2 is a cross-sectional view showing a state where a battery temperature is detected by another structure that has been studied by the applicant.
Figure 3:
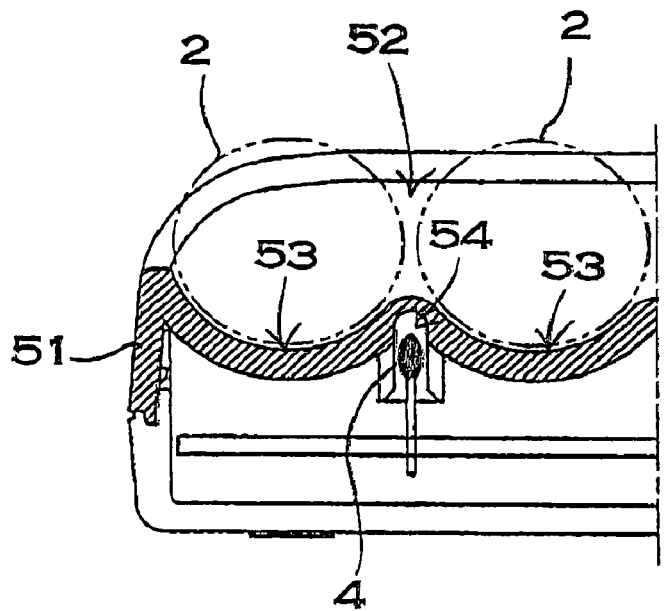
FIG. 3 is a cross-sectional view showing a battery temperature detection part of another conventional charger.
Figure 4:
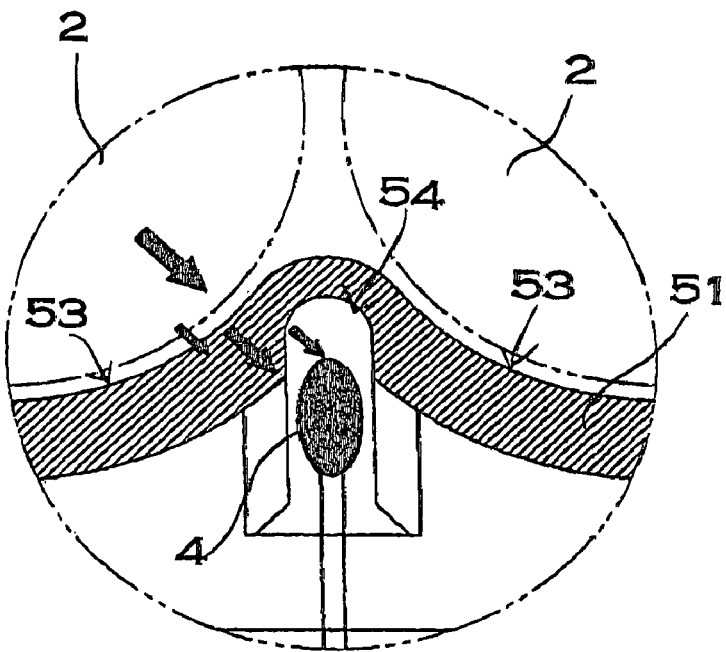
FIG. 4 is a cross-sectional view showing a state where the charger shown in FIG. 3 detects a battery temperature by a temperature sensor.

Hereinafter, first, an entire structure of a charger is described, then a heat conduction plate as a characteristic of the present invention is described in detail. The charger shown in FIGS. 5 through 12 has an exterior rectangular box shape and is provided with a battery pocket 3 in an upper surface of a case 1 that detachably mounts a battery 2 to be charged. The case 1, shown in a plan view of FIG. 6, is provided with the battery pocket 3 in the lower part of this figure. The battery pocket 3 is provided with a temperature detection portion 12 that detects a temperature of the battery 2 mounted thereto. A charge circuit (not shown) that detects a battery temperature by the temperature detection portion 12 and controls an average charge current for the battery 2 is installed on a circuit board 5 in the case 1 of the charger. This charger is basically symmetric on the left and right sides except for a power line 32, a socket 33, or the like, in the paper plane of FIG. 6.

The case 1 is made of a resin material, and is composed of a lower case 1B and an upper case 1A. The upper case 1A is connected to the lower case 1B. The circuit board 5 is installed in the case 1. The circuit board 5 is fastened to the lower case 1B. Output terminals 6 and 7 to be connected to positive and negative terminals of the battery 2 attached to the battery pocket 2 are fastened to the circuit board 5. The output terminals 6 and 7 are metal plates that are elastically deformed. The charger has four pairs of output terminals to charge four AA batteries 2A that are attached to the battery pocket 3 as shown in FIG. 6.

In addition, the charger of the figures can charge the battery 2 in both cases of AA battery 2A and AAA battery 2B with different dimensions. A rechargeable AA battery 2A or AAA battery 2B as an electric cell is a long cylindrical battery. In more detail, it is provided with the positive and negative terminals at both ends, and a surface of a metal case is covered with a resin tube except the terminals.

Figure 11:
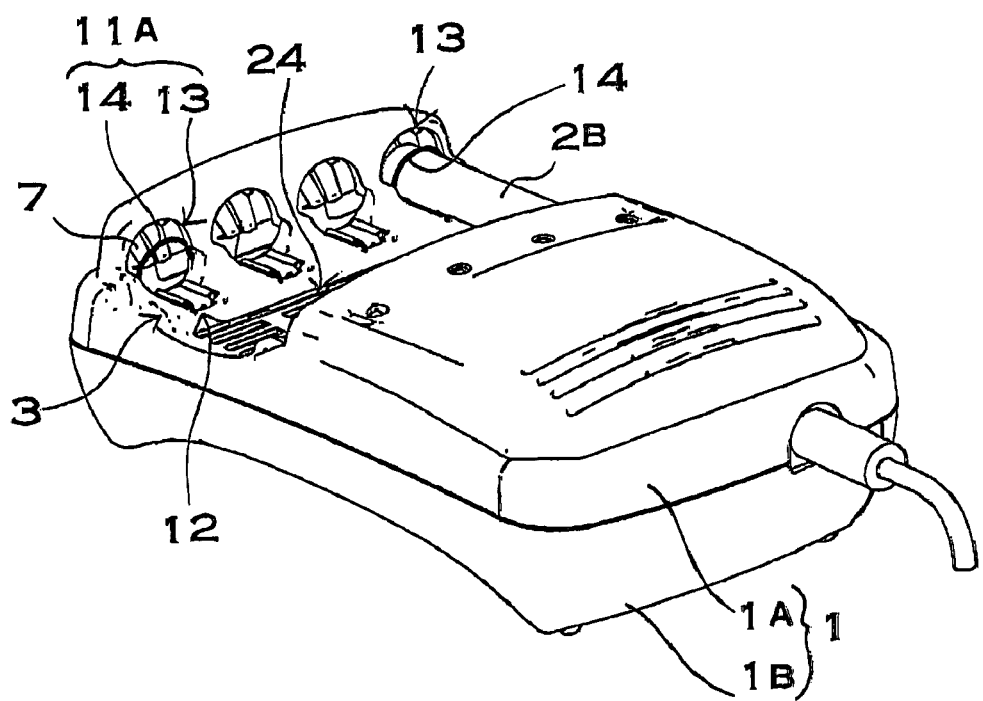
FIG. 11 is a perspective back view showing a state where a AAA battery is attached to the charger shown in FIG. 10.
Figure 12:
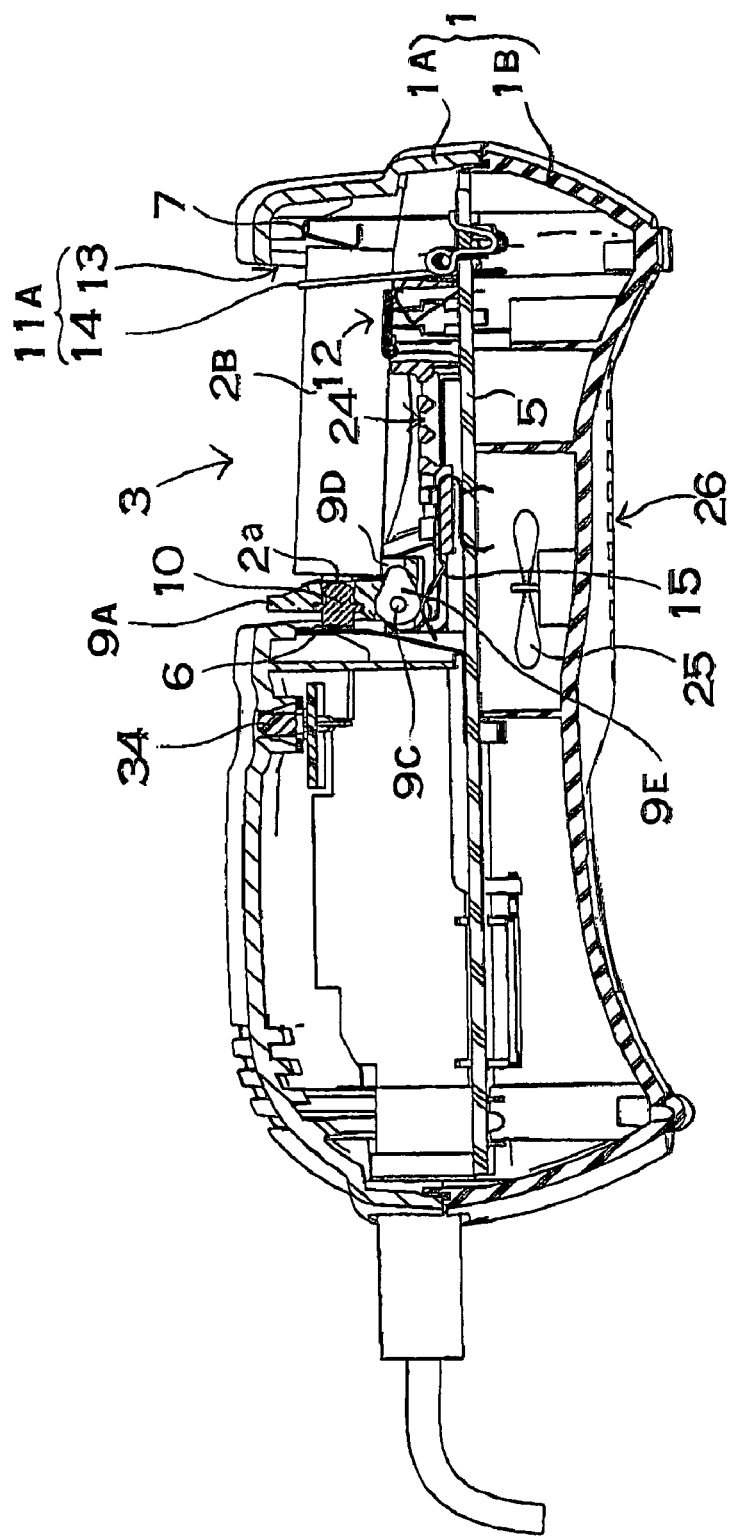
FIG. 12 is a cross-sectional view of the charger shown in FIG. 10 corresponding to the cross-sectional view taken along the line A-A shown in FIG. 6.

FIGS. 6 through 9 show a state where the AA battery 2A is being charged. The AA battery 2A is attached to the battery pocket 3 in a state where the output changer terminal 8 folds. The AA battery 2A is charged in a state where its positive terminal and the other negative terminal are in contact with the output terminals 6 and 7, respectively. In addition, the AA battery 2A located in a holder 11 at the left end is shown by a solid line, AA batteries 2A located in the other holders 11 are shown by dashed lines in FIG. 6, and thus, a total of four batteries can be attached. Additionally, FIGS. 11 and 12 show a state where a AAA battery 2B, which is smaller than a AA battery, is being charged. As shown in these figures, two AAA batteries 2B are attached to the left and right sides in the paper plane of FIG. 6 in the battery pocket 3, and thus are charged in a state where the output changer terminal 8 stands in an upright position (only one AAA battery 2B is shown in FIG. 11). The output changer terminal 8 in this position connects the output terminal 6 to the terminal of the AAA battery 2B through a metal auxiliary terminal 10 as shown in FIG. 12. The auxiliary terminal 10 is located between the terminal of the AAA battery 2B and the output terminal 6, and connects the output terminal 6 to the terminal of the AAA battery 2B. This structure provides a connection of the AAA battery 2B, which is smaller than the AA battery 2A, to the output terminal 6. The output terminal 7 is connected to the negative terminal of the AAA battery 2B.

Figure 10:
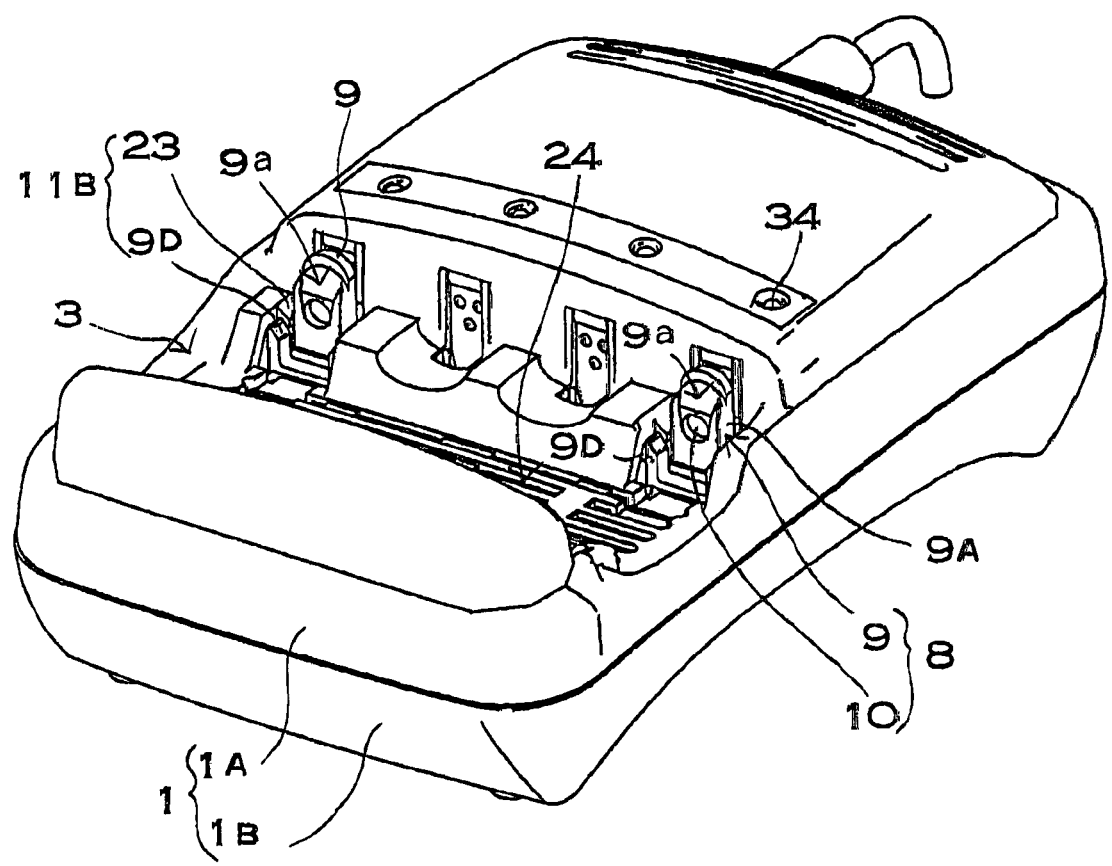
FIG. 10 is a perspective view showing a state where an output changer terminal of the charger shown in FIG. 5 stands in an upright position.
Figure 13:
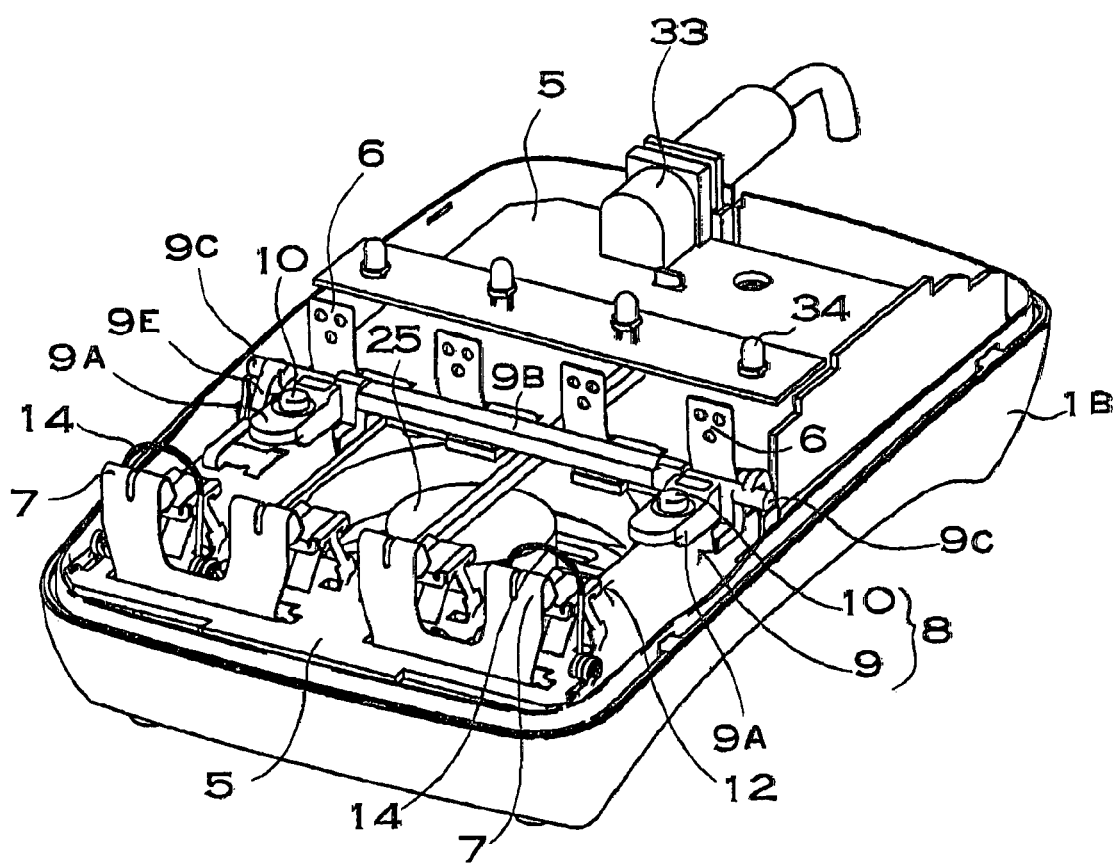
FIG. 13 is a perspective view showing a state where an upper case of the charger shown in FIG. 5 is removed.

The output changer terminal 8 has the auxiliary terminal 10 that is fastened to a support member 9 made of plastic. The auxiliary terminal 10 is located between the terminal of the AAA battery 2B and the output terminal 6 in the state where the output changer terminal 8 stands in an upright position as shown in FIG. 12, and connects the output terminal 6 to the terminal of the AAA battery 2B. As shown in FIG. 13, the support member 9 has a substantially plate-shaped insulating base portion 9A with each auxiliary terminal 10 fastened thereto, and a connection portion 9B for connection of the insulating base portion 9A. As shown in FIG. 10, each insulating base portion of the output changer terminal 8 is provided with a recessed section 9a that can accommodate the positive terminal as a protrusion terminal 2a of the AAA battery 2B. The auxiliary terminal 10 penetrates the bottom of the recessed section 9a, and thus, the auxiliary terminal 10 can be in contact with the protrusion terminal 2a of the AAA battery 2B as the positive terminal. The support member 9 rotatably connects a shaft 9C that protrudes at its both ends to the case 1 or the circuit board 5 such that a surface of the plate shaped insulating base portion 9A can rotate from a horizontal position to an upright position. As shown in FIG. 10, the support member 9 has support protrusions 9D that define a divergent shape to hold the lower part of the AAA battery 2B in a state where the surface of plate shape stands in an upright position.

Figure 9:
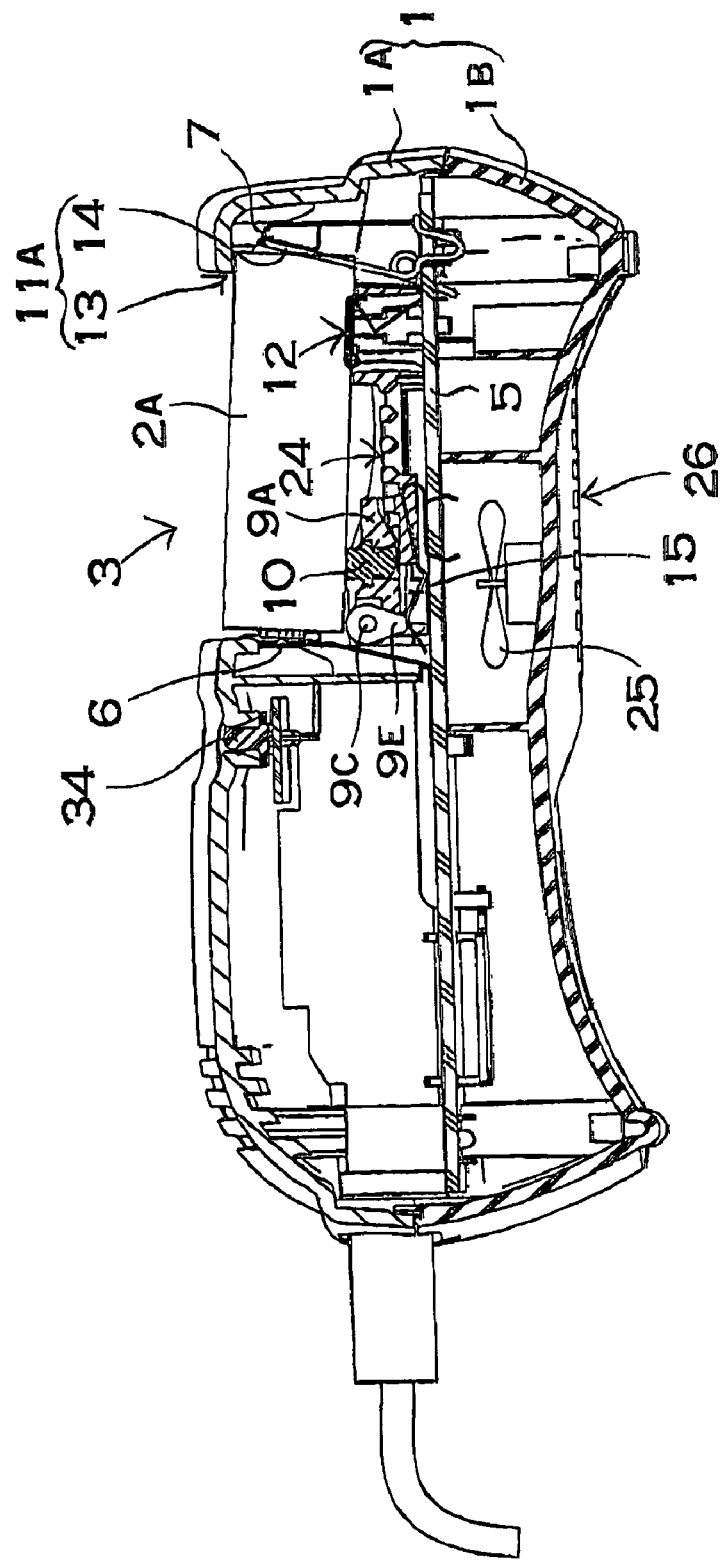
FIG. 9 is a cross-sectional view of the charger taken along a line A-A shown in FIG. 6.

FIG. 12 shows a state where the AAA battery 2B is charged. In this state, the insulating base portion 9A stands in an upright position, thus, the output changer terminal 8 is located in the front of the output terminal 6 for the AA battery 2A. When the insulating base portion 9A stands in an upright position, the auxiliary terminal 10 is connected to the charge circuit (not shown) for the AAA battery 2B. In the case where the AAA battery 2B is charged, a switch press portion 9E that is unitarily formed with the shaft 9C of the output changer terminal releases pressure of a position switch 15 that is located on the circuit board 5 and turns the position switch to OFF, and thus provides a connection to the charge circuit for the AAA battery 2B. As shown in FIG. 9, when the insulating base portion 9A folds in a horizontal position, in the case where the AA battery 2A is charged, the switch press portion 9E rotates and presses the position switch 15 to turn it to ON, and thus provides a connection to a charge circuit for the AA battery 2A. The switch press portion 9E is a cam that protrudes from the shaft 9C of the support member 9 as shown in FIGS. 9 and 12. The switch press portion 9E has a structure that presses the position switch 15 located on the circuit board 5 with its fore end in the state where the insulating base portion 9A folds in a horizontal position, and releases the pressure of the position switch 15 by rotating the cam in the state where the insulating base portion 9A stands in an upright position.

Figure 5:
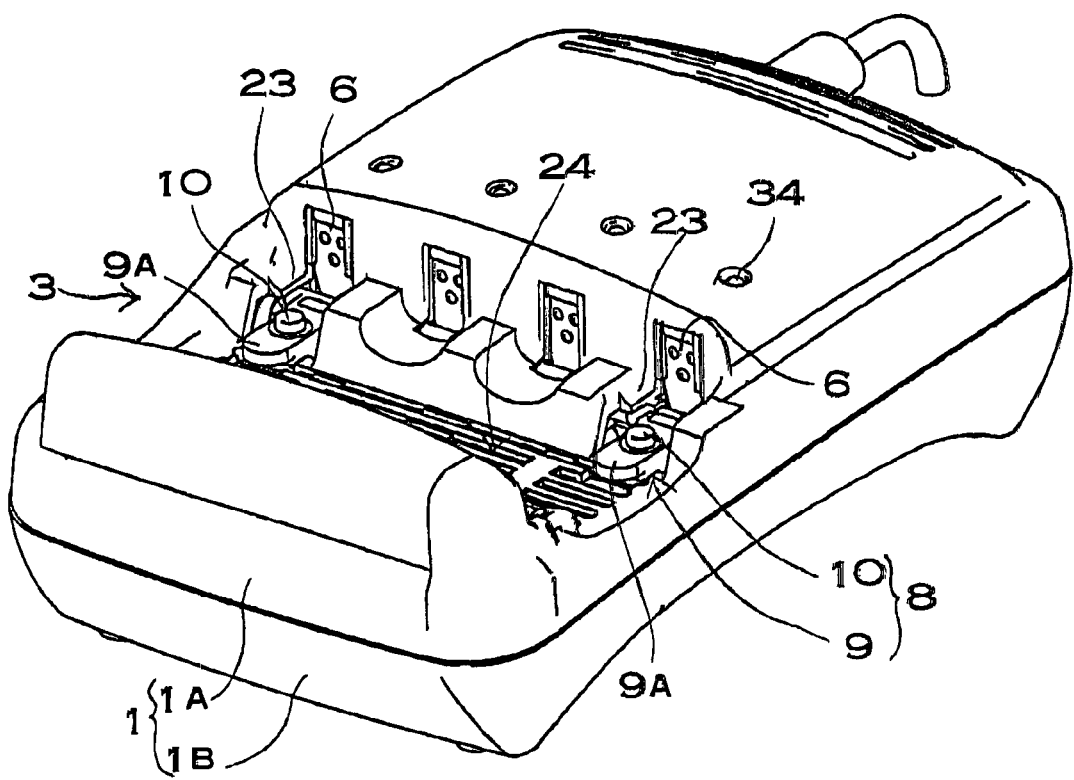
FIG. 5 is a perspective view of a charger according to one embodiment of the present invention.
Figure 6:
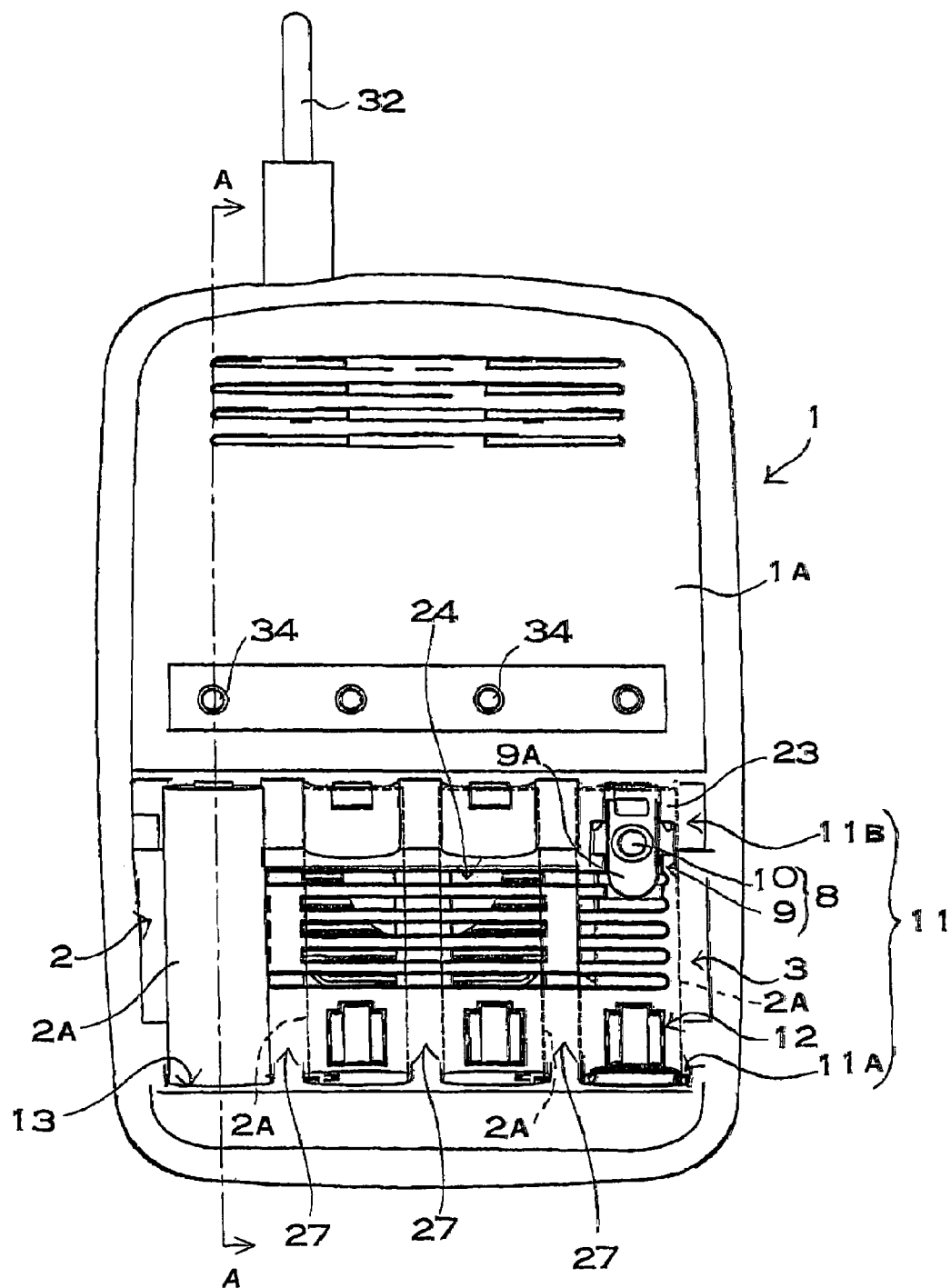
FIG. 6 is a plan view showing a state where a AA battery is attached to the charger shown in FIG. 5.

In the case where the AA battery 2A is charged, as shown in FIGS. 5 and 9, the insulating base portion 9A of the output terminal 8 folds in a horizontal position and is moved from the front to under the output terminal 6 for AA battery 2A. The insulating base portion 9A that is moved to this position does not interfere with attachment of the AA battery 2A to the battery pocket 3. In other words, the insulating base portion 9A is moved to a position that does not interfere with attachment of the AA battery 2A to the battery pocket 3. In this state, when the AA battery is attached to the battery pocket 3, the AA battery 2A is connected to the output terminal 6 that is fastened to the circuit board 5. The output terminal 6 is connected to the charge circuit (not shown), thus, the AA battery 2A is charged.

Figure 7:
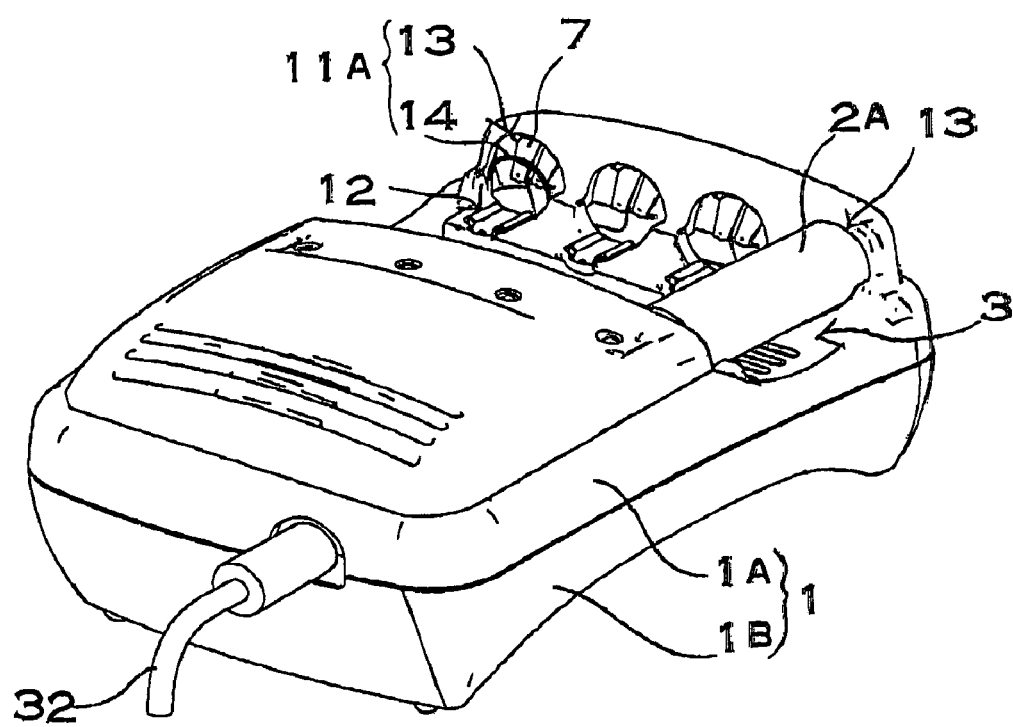
FIG. 7 is a perspective back view of the charger shown in FIG. 6.
Figure 8:
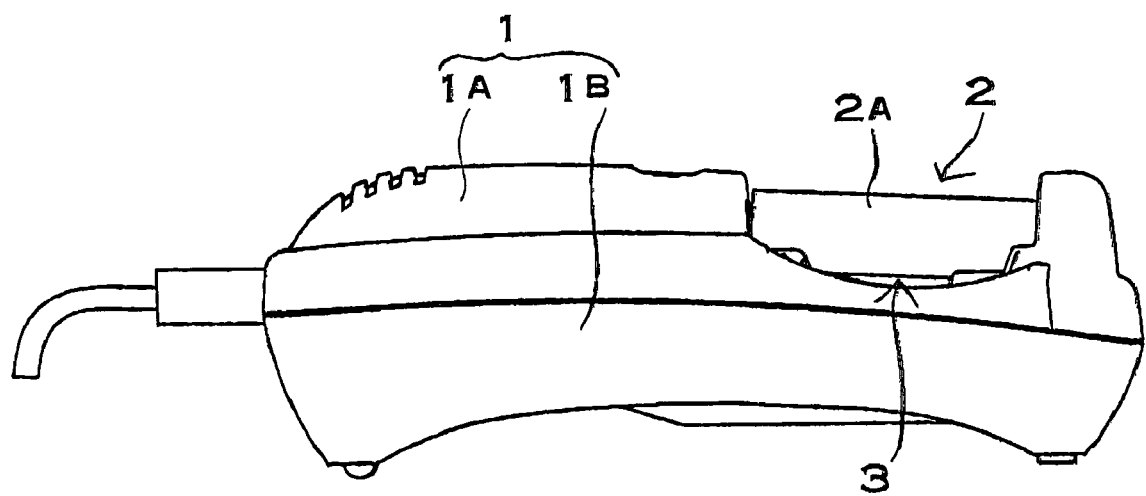
FIG. 8 is a side view of the charger shown in FIG. 6.

This type of charge circuit controls an average charge current so as to hold a battery temperature at a predetermined hold temperature, and charges a battery in a short time. The case 1 shown in the figures is provided with the holder 11 that is composed of a pair of first and second holding portions 11A and 11B for holding both ends of the cylindrical battery 2 without deviation. As shown in FIGS. 7 and 11, the first holding portion 11A has a circular opening 13 as a holder for AA battery 2A and an elastic arch 14 as a holder for AAA battery 2B. The circular opening 13 penetrates the surface of the case 1 so as to hold the negative-side end of the AA battery 2A that is inserted therein. In order to insert the end of the AA battery 2A as a cylindrical battery, the interior shape of the circular opening 13 is dimensioned to be slightly larger than the exterior shape of the AA battery 2A. Dimensioning the interior shape of the circular opening 13 to be slightly larger than the exterior shape of the AA battery 2A refers to providing a shape that will permit smooth insertion and removal of the AA battery 2A into/from the circular opening 13 but will hold it in the insertion state without deviation.

In order to insert the end of the AAA battery 2B that is inserted into the elastic arch 14 as a holder for AAA battery 2B, its interior shape is dimensioned to be slightly larger than the exterior shape of the AAA battery 2B. Dimensioning the interior shape of the elastic arch 14 to be slightly larger than the exterior shape of the AAA battery 2B refers to providing a shape that will allow smooth insertion and removal of the AAA battery 2B into/from the elastic arch 14 but will hold it in the insertion state without deviation. However, the interior shape of the elastic arch 14 is smaller than the exterior shape of the AA battery 2A, and has a shape that will not permit insertion of the AA battery 2A.

The AAA battery 2B is inserted into the elastic arch 14 and is attached to a predetermined position in the battery pocket 3. The AAA battery 2B that is attached to the predetermined position is in proper contact with the temperature detection portion 12, and thus, its battery temperature can be detected. When the AAA battery 2B that is not attached to the predetermined position, its temperature cannot be accurately detected. In order for the temperature detection portion 12 to properly detect the temperature of the AAA battery 2B for charging, the elastic arch 14 has a mechanism that detects whether the AAA battery 2B is attached in the proper position.

Figure 14:
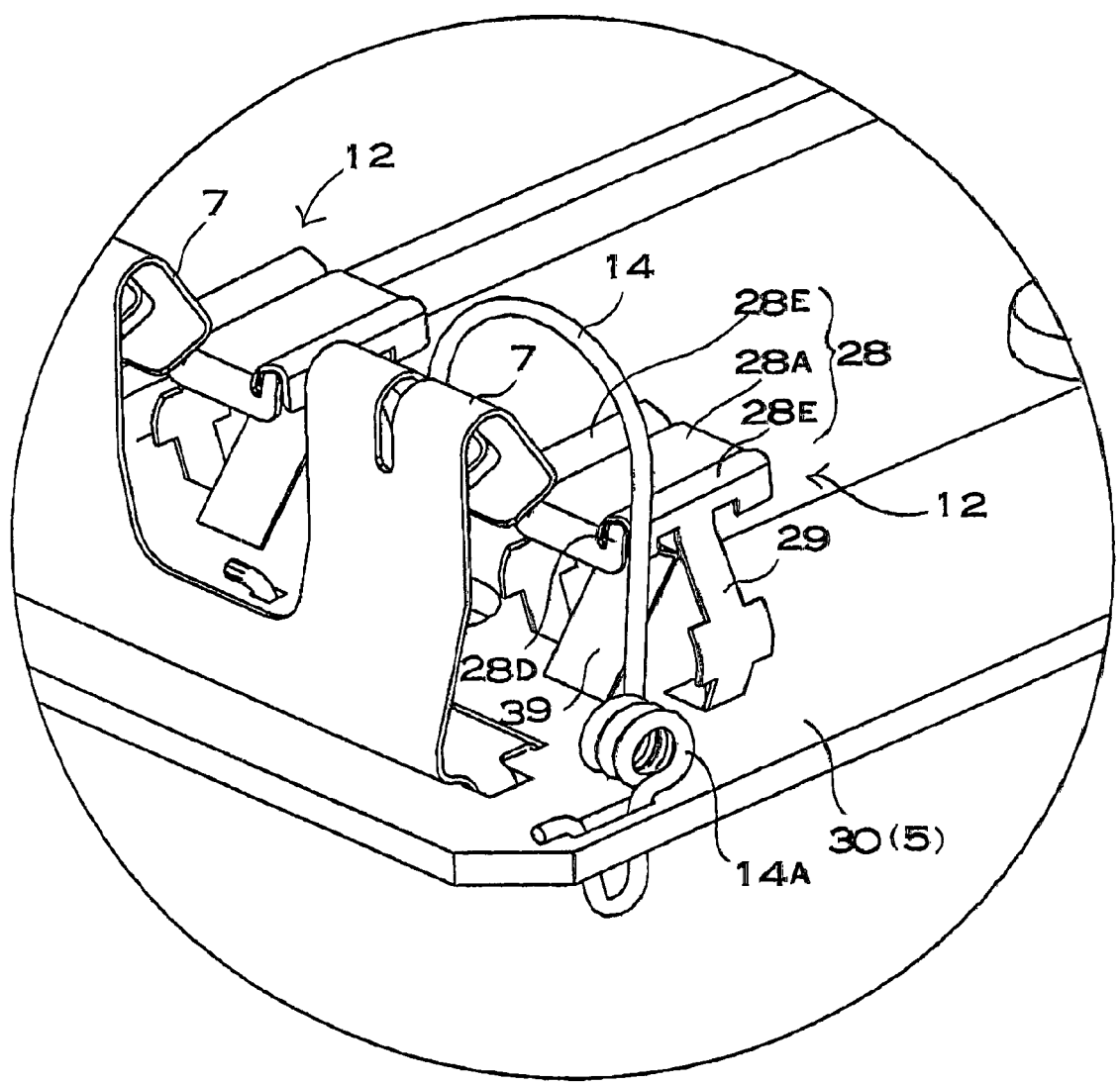
FIG. 14 is an enlarged perspective view showing the periphery of a temperature detection portion of the charger shown in FIG. 13.
Figure 15:
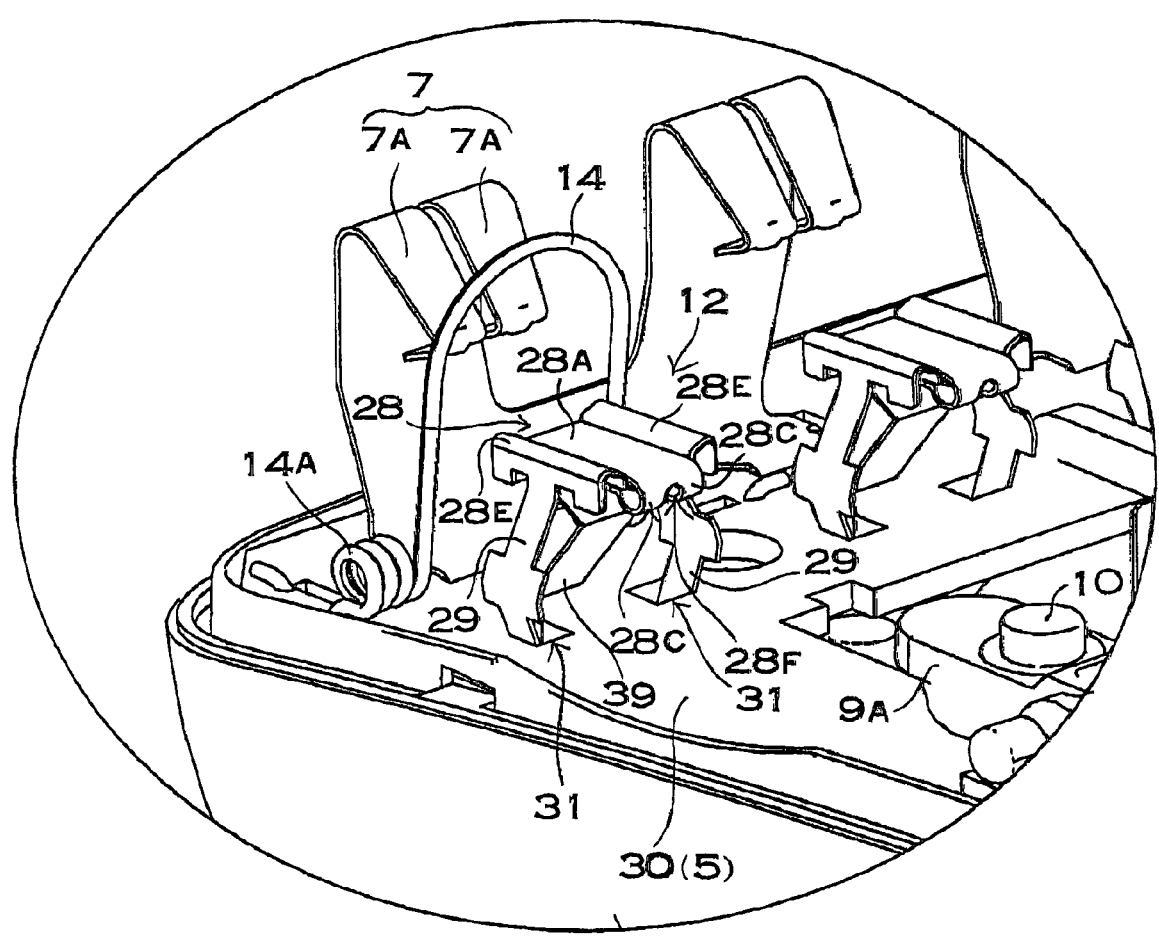
FIG. 15 is a perspective view of the temperature detection portion shown in FIG. 14 as viewed from the opposite side.
Figure 16:
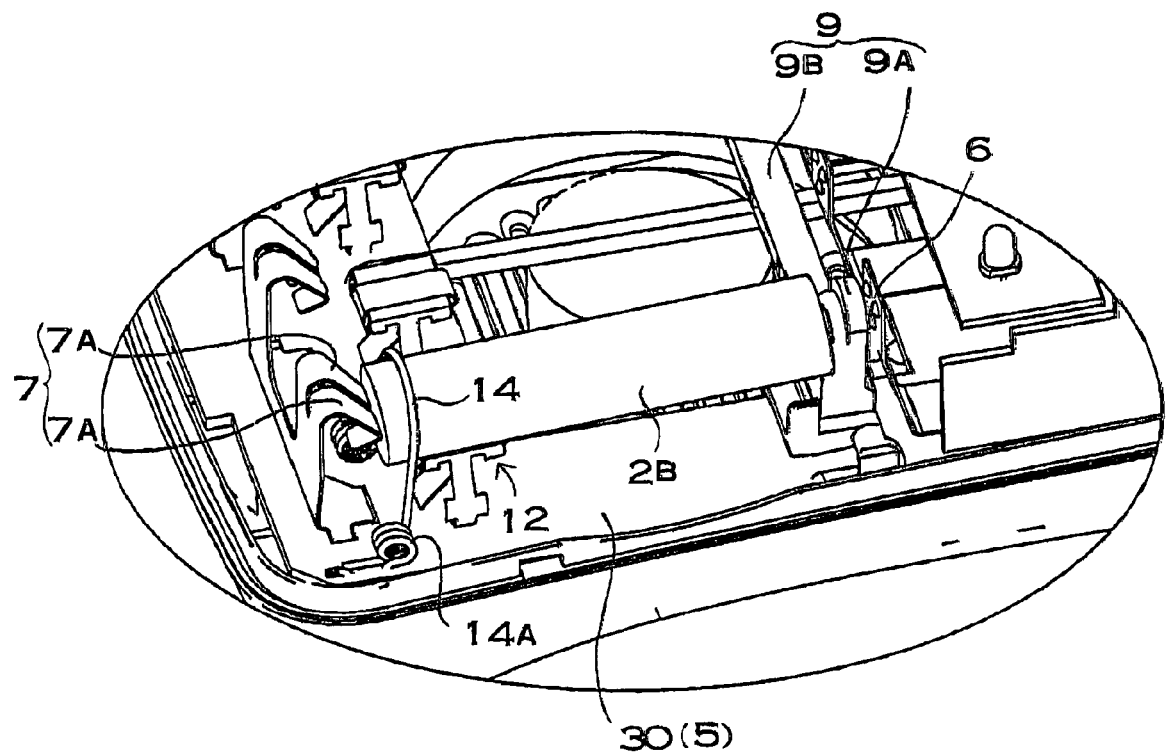
FIG. 16 is a perspective view showing a state where a AAA battery is attached to the charger shown in FIG. 10 and the upper case is removed.
Figure 17:
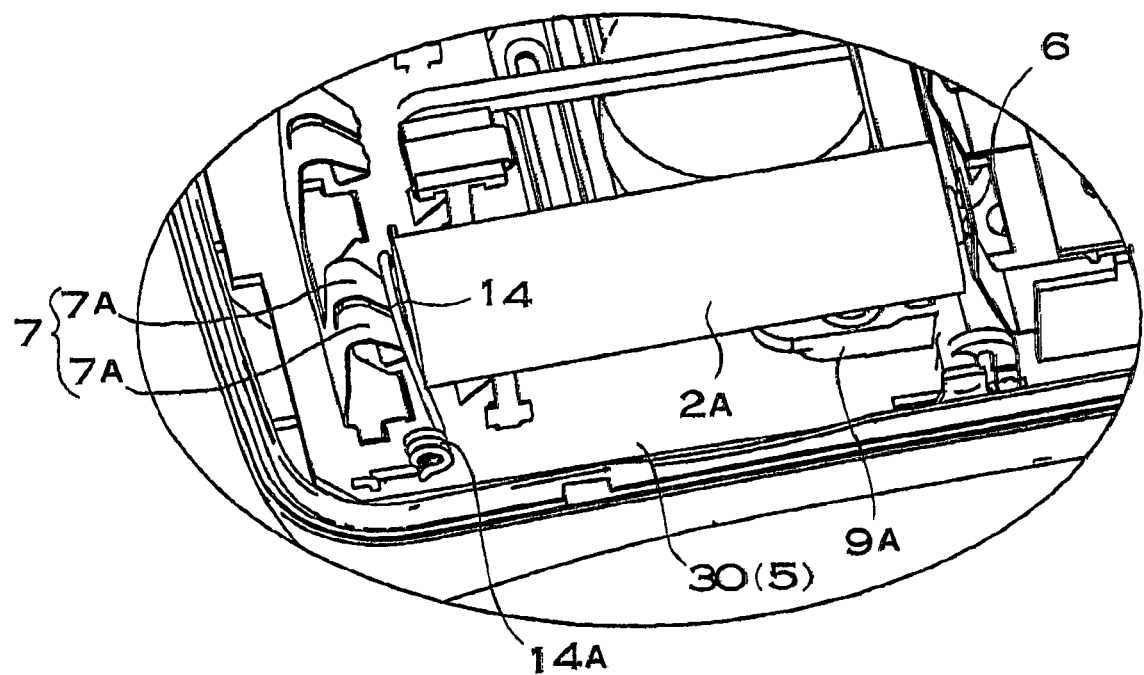
FIG. 17 is a perspective view showing a state where a AA battery is attached to the charger shown in FIG. 5 and the upper case is removed.

As shown in the enlarged perspective views of FIGS. 14 and 15, the elastic arch 14 is an elastic metal wire that is bent in a U-shape and is fastened to the circuit board 5 at its both ends. The elastic arch 14 has a coil spring portion 14A at its lower part that can smoothly tilt. In a state where the elastic arch 14 is not pressed as shown in FIG. 14 by the battery 2, the elastic arch 14 is located away from the output terminal 7, and is located such that the AAA battery 2B is inserted in the elastic arch 14 and is held in the predetermined position as shown in FIG. 16. As shown in FIG. 17, when pressed by the AA battery 2A, the elastic arch 14 is elastically deformed and thus is in contact with the output terminal 7. In addition, when pressed by the AAA battery 2B that is not attached in the proper position, the elastic arch 14 is also in contact with the output terminal 7. That is, the elastic arch 14 is in contact with the output terminal 7 when the AA battery 2A is attached in the proper position, and is not in contact with the output terminal 7 when the AAA battery 2B is attached in the proper position. Accordingly, it is possible to detect that the AAA battery 2B is attached in the proper position based on the detection of whether the elastic arch 14 is in contact with the output terminal 7.

Figure 18:
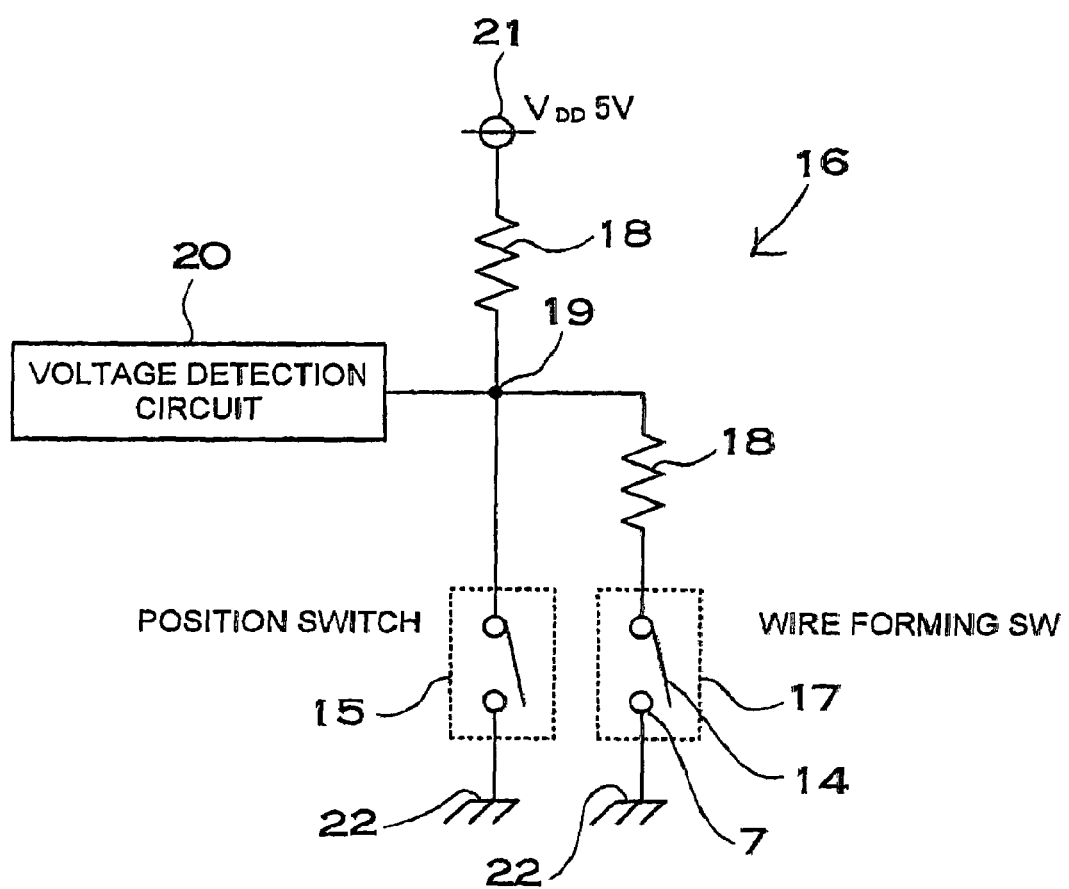
FIG. 18 is a circuit diagram showing an exemplary detection circuit.

FIG. 18 is a circuit diagram showing a detection circuit 16 that detects whether the elastic arch 14 is in contact with the output terminal 7. The elastic arch 14 turns to ON when in contact with the output terminal 7 and turns to OFF when not in contact with the output terminal 7, and thus composes wire forming SW17. The elastic arch 14 and the output terminal 7 serve as contacts of the wire forming SW17. The output terminal 7 as one of the contacts is connected to the negative terminal of the battery 2, and thus is connected to the ground side. The detection circuit 16 includes a voltage dividing resistor 18 composed of two resistors that are connected in series, and a voltage detection circuit such as a microcomputer that detects a voltage of the intermediate connection point of the voltage dividing resistor 18. The wire forming SW17 is connected to the voltage dividing resistor 18 in series and is connected to a power supply 21. In the detection circuit 16 of the figure, one end of the voltage dividing resistor 18 is connected to the positive side of the power supply 21, and the other end is connected to the elastic arch 14 that composes the wire forming SW17. The output terminal 7 of the wire forming SW17 is connected to a ground 22 as the negative side of the power supply 21. In addition, the detection circuit 16 includes the position switch 15 that detects a rotational position of the output changer terminal 8 for change between AA battery 2A and AAA battery 2B. The position switch 15 is connected between the intermediate connection point of the voltage dividing resistor 18 and the ground 22. The position switch 15 is switched to ON when the AA battery 2A is in its charge position, and is switched to OFF when the AAA battery 2B is in its charge position.

The aforementioned detection circuit 16 detects whether the AA battery 2A or AAA battery 2B is attached to a proper position by the following operation.

(1) In the Case Where the AA Battery 2A is Properly Attached

In this state, the position switch 15 and the wire forming SW17 turn to ON. Because the position switch 15 is turned to ON when the AA battery 2A is in its charge position, and the wire forming SW17 is turned to ON by contact of the AAA battery 2B with the elastic arch 14, as shown in FIG. 9. Since the position switch 15 is turned to ON, the voltage of the intermediate connection point 19 becomes 0 V. Thus, it is confirmed that the voltage of the intermediate connection point 19 is 0 V, then the AA battery 2A starts to be charged. When the position switch 15 is turned to ON, the voltage of the intermediate connection point 19 becomes 0 V irrespective of ON/OFF of the wire forming SW17. In this state, it is impossible to detect ON/OFF of the wire forming SW17, but the wire forming SW17 necessarily is turned to ON when the AA battery 2A is attached. Accordingly, it is not necessary to detect ON/OFF of the wire forming SW17. The interior shape of the elastic arch 14 is smaller than the exterior shape of the AA battery 2A. This is the reason that the wire forming SW17 necessarily is turned to ON.

(2) In the Case Where the AAA Battery 2B is Properly Attached

In this state, the position switch 15 and the wire forming SW17 turn to OFF. As shown in FIG. 12, the output changer terminal 8 is moved to the charge position for AAA battery 2B, and thus, the position switch 15 is turned to OFF. Additionally, the AAA battery 2B is inserted through the elastic arch 14, and the elastic arch 14 is out of contact with the output terminal 7, and thus, the wire forming SW17 is turned to OFF. Since the position switch 15 and the wire forming SW17 turn to OFF, the voltage of the intermediate connection point 19 becomes a power supply voltage. Consequently, when the voltage of the intermediate connection point 19 is the power supply voltage, it is detected that the AAA battery 2B is properly attached, thus, the AAA battery 2B starts to be charged.

(3) In the Case Where the AAA Battery 2B is Not Properly Attached.

Figure 19:
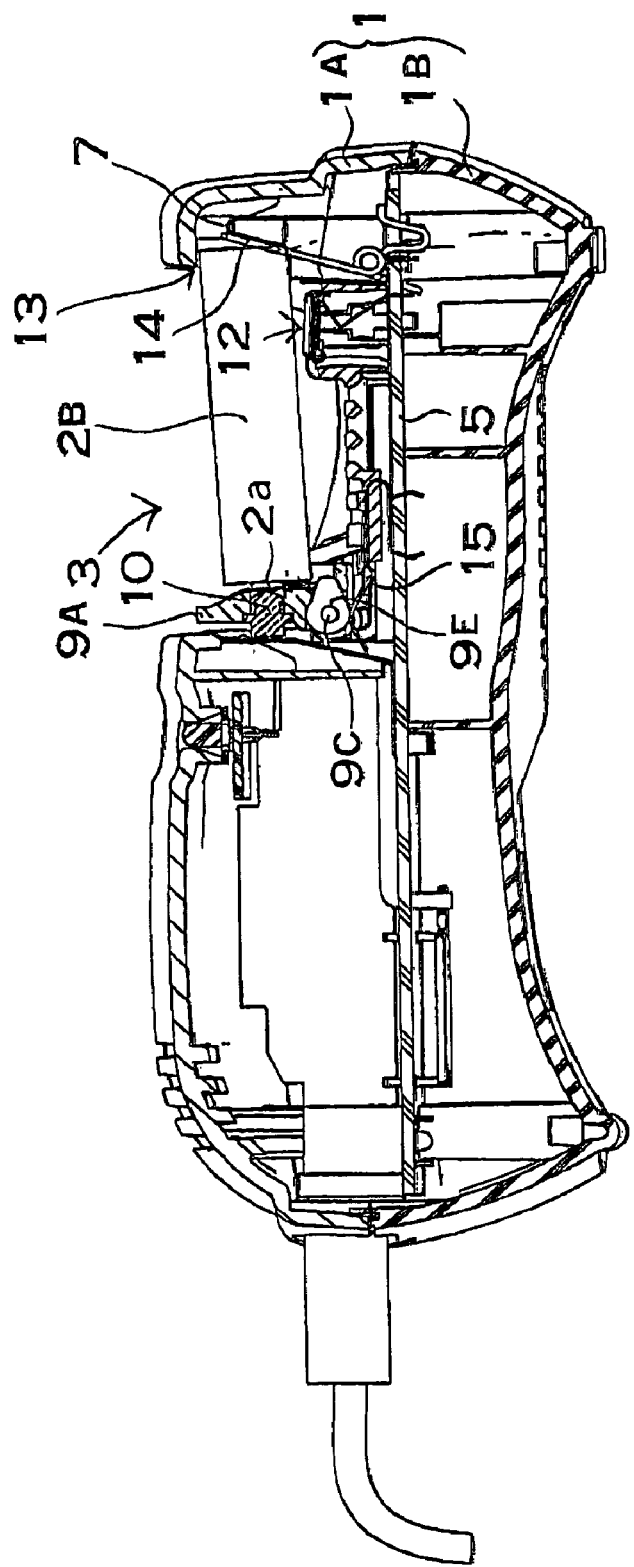
FIG. 19 is a cross-sectional view showing a state where a AAA battery is not properly attached to the charger shown in FIG. 12.

In the case where the AAA battery 2B is not properly attached, the elastic arch 14 is pressed to the output terminal 7 as shown in FIG. 19, and the wire forming SW 17 is turned to ON. In this state, since the position switch 15 is turned to OFF and the wire forming SW 17 is turned to ON, the voltage of the intermediate connection point 19 of the voltage dividing resistor 18 becomes a voltage that is divided at the ratio between the resistors of the voltage dividing resistor 18. In the case where resistors with the same resistance are connected as the voltage dividing resistor 18 in series, the voltage of the intermediate connection point 19 is ½ the power supply voltage.

Consequently, when the voltage of the intermediate connection point 19 is a voltage that is divided by the voltage dividing resistor 18, for example, ½ the power supply voltage, it is detected that the AAA battery 2B is not properly attached, and thus, the AAA battery 2B does not start to be charged.

If the AAA battery 2B is attached in this state, the temperature detection 12 cannot accurately detect a battery temperature. The reason is that the temperature detection portion 12 is not in proper contact with the surface of the AAA battery 2B. If the AAA battery 2B is charged in the state where its temperature cannot accurately be detected by the temperature detection portion 12, this causes an abnormal rise of its battery temperature and may deteriorate the battery. For this reason, the AAA battery 2B does not start to be charged in this state.

In the aforementioned detection circuit 16, the one end of the voltage dividing resistor 18 is connected to the positive side of the power supply 21, and the wire forming SW17 and the position switch 15 are connected to the ground 22 as the negative side of the power supply 21. However, contrary to this, one end of the voltage dividing resistor can be connected to the ground as the negative side of the power supply, and the wire forming SW and the position switch can be connected to the positive side of the power supply to detect whether a AA or AAA battery is attached to the proper position.

As shown in FIGS. 5 and 10, the second holding portion 11B has a support section 23 as a holder for AA battery 2A and the support protrusions 9D as a holder for AAA battery 2B. The support portion 23 has a groove shape that has divergently inclined surfaces or curved surfaces in a cross-sectional view perpendicular to the longitudinal direction of the mounted AA battery 2A, and holds the lower part on the positive side of the AA battery 2A such that the AA battery 2A inserted in the groove does not move laterally. The support protrusions 9D as a holder for AAA battery 2B are a pair of protrusions that are provided inside the lower part of the insulating base portion 9A standing in an upright position and define a divergent shape, and hold the lower part on the positive side of the AAA battery 2B such that the AAA battery 2B mounted thereto does not move laterally. In the battery pocket 3 of the figures, one of holders 11 has a shape to which an end of the battery 2 can be inserted. However, both holders can have a hole shape to which an end of the battery can be inserted. Alternatively, both holders can have a shape in which the battery does not move laterally.

In the case where the AAA battery 2B is mounted, the battery is held as shown in FIGS. 11 and 12. The negative output terminal 7 is composed of metal contact pieces. The negative output terminal 7 is bent in a hill shape so as to protrude toward the negative terminal of the AA battery 2A or AAA battery 2B as shown in FIGS. 14 through 17. The output terminal 7 is provided with two rows of contact pieces 7A that are deformed independently from each other (see FIG. 15).

The battery pocket 3 of the figures is provided with cooling openings 24 between the first and second holding portions 11A and 11B. Air that is blown by a cooling fan 25 installed in the case 1 passes through the cooling openings 24 and thus actively cools the battery. The charger that has the cooling fan 25 installed in the case 1 and actively blowing air on the battery through the cooling openings 24 has a feature that can fully charge batteries at a low battery temperature in a short time. In the case 1, the bottom plate of the lower case 1B is curved in a concave shape in its central part and is provided with ventilation holes 26, and thus, external air can be effectively drawn by the cooling fan 25. The cooling fan 25 accommodated in the case 1 draws external air through the ventilation holes 26 in the bottom plate, and actively blows the drawn air toward the battery 2 through the cooling openings 24 for cooling.

In the battery pocket 3 of the charger, the first and second holding portions 11A and 11B are located so as to form gaps 27 (see FIG. 6) between adjacent batteries 2. In the charger, the air actively blown toward the batteries 2 through the cooling openings 24 passes through the gaps between the batteries 2. As a result, the batteries 2 mounted to the battery pocket 3 can be effectively cooled with the air actively blown. Therefore, there is a feature that can charge batteries with a small battery temperature rise. Note that, in FIG. 6, the AA battery 2A located in the holder 11 at the left end is shown by a solid line, AA batteries 2A located in the other holder portions 11 are shown by dashed lines.

The charger includes four sets of temperature detection portions 12 that are pressed toward the respective cylindrical surfaces of batteries 2 mounted in the battery pocket 3. The temperature detection portions 12 independently detect the respective temperatures of the batteries 2 mounted in the battery pocket 3. In order to charge the four batteries 2, the charger of the figures includes the four sets of the temperature detection portions 12 that detect the battery temperatures, respectively.

The heat conduction plate as a characteristic of the present invention is now described in detail.

The temperature detection portion 12 shown in FIGS. 14, 15, and 20 through 24 includes a heat conduction plate 28 and a temperature sensor 4 that is fastened to the heat conduction plate 28. The heat conduction plate 28 includes a pair of upper and lower sandwich plates 28A and 28B that sandwich the temperature sensor 4, and an elastic connection arm 28C that connects the upper and lower sandwich plates 28A and 28B at a first end side, and an interlock portion 28D that is located at a second end side opposite to the first end side and couples the upper and lower sandwich plates 28A and 28B sandwiching the temperature sensor 4. In the heat conduction plate 28, the elastic connection arm 28C connects first ends as one ends of the upper and lower sandwich plates 28A and 28B, and the interlock portion 28D couples second ends of the upper and lower sandwich plates 28A and 28B, thus, the upper and lower sandwich plates 28A and 28B sandwich and fasten the temperature sensor 4.

The temperature sensor 4 includes a temperature detection element 4A that is fastened to a flexible substrate 39. The temperature sensor 4 is available on the market. As shown in cross-sectional views of FIGS. 20 through 23, the temperature detection element 4A of a thick substantially rectangular shape protrudes in the surface of the flexible substrate 39. The flexible substrate 39 has a width that allows the flexible substrate 39 to be guided between protrusion strips 28E provided in the lower sandwich plate 28B at its both sides. The temperature sensor 4 is sandwiched between the upper and lower sandwich plates 28A and 28B, thus, the temperature detection element 4A is fastened to the heat conduction plate 28 in a state where the temperature detection element 4A is in intimate contact with or close to the inner surfaces of the upper and lower sandwich plates 28A and 28B as shown in the figures. The flexible substrate 39 of the temperature sensor 4 is drawn out from the heat conduction plate 28 and is connected to the circuit board (see FIG. 22, etc.). A thermistor is employed as the temperature sensor 4, but a temperature sensor other than a thermistor can be employed.

FIGS. 20 through 24 show a state where the upper and lower sandwich plates 28A and 28B sandwich and fasten the temperature sensor 4 in the heat conduction plate 28. The upper and lower sandwich plates 28A and 28B sandwich and fasten the temperature sensor 4 as follows.

(1) In a state shown by dashed lines, that is, in a state where the upper and lower sandwich plates 28A and 28B are opened and are not coupled by the interlock portion 28D, the temperature sensor 4 is positioned on the lower sandwich plate 28B.

(2) The upper sandwich plate 28A pivots in a direction shown by arrows, and the upper and lower sandwich plates 28A and 28B sandwich the temperature sensor 4. The upper sandwich plate 28A pivots in this direction, thus, the elastic connection arm 28C is elastically deformed. The upper sandwich plate 28A pivots in the direction shown by the arrows, and the upper sandwich plate 28A moves in a direction closer to the lower sandwich plate 28B, thus, the upper and lower sandwich plates 28A and 28B sandwich the temperature sensor 4.

(3) When the upper and lower sandwich plates 28A and 28B approach each other until they sandwich and fasten the temperature sensor 4, the interlock portion 28D interlocks with the inner surfaces of the protrusion strips 28E, thus, the upper and lower sandwich plates 28A and 28B are coupled so as not to be opened. This completes the assembly.

In the temperature detection portion 12, a part of the heat conduction plate 28 that is pressed toward the battery 2 has a shape corresponding to the cylindrical shape of the battery 2. In the heat conduction plate 28 shown in the figures, the part has a groove shape. This shape can provide effective conduction of heat of the battery 2 to the heat conduction plate 28. The heat conduction plate 28 is preferably in contact with the battery surface in terms of heat conduction, but there may be a small gap between them. In the temperature detection portion 12 shown in the figures, elastic legs 29 elastically press the heat conduction plate 28 toward the battery surface. The elastic legs 29 are formed unitarily with the heat conduction plate 28 that is made of an elastically deformable metal plate.

In the charger of the figures, the temperature detection portion 12 is located at a position closer to the first holding portion 11A relative to the center of the battery 2. In the charger of the figures, since the temperature detection portion 12 is located at a position closer to the holding portion of a hole shape to which the end of the battery 2 is inserted, even if the heat conduction plate 28 of the temperature detection portion 12 upwardly presses the battery 2, it can effectively prevent upward deviation of the battery 2. The reason is that the holding portion of a hole shape can prevent vertical and lateral deviation of the battery 2. For this reason, in the charger of this structure, the heat conduction plate 28 of the temperature detection portion 12 can be firmly pressed onto the surface of the battery 2, therefore, it is possible to more accurately detect the battery temperature.

The four heat conduction plates 28 have substantially the same shape. The heat conduction plate 28 is made of an elastically deformable metal plate. The upper and lower sandwich plates 28A and 28B of the heat conduction plate 28 sandwich the temperature sensor 4. The upper and lower sandwich plates 28A and 28B that sandwich the temperature sensor 4 are elastically pressed onto the battery surface by the elastic legs 29, thus, the battery temperature is detected. The lower sandwich plate 28B of the heat conduction plate 28 of the figures is provided with the protrusion strips 28E at its both sides. The protrusion strips 28E are located at both sides of the lower sandwich plate 28B, in more detail, outsides of the upper sandwich plate 28A. The protrusion strips 28E can be formed by bending a metal plate to form a groove shape. The upper sandwich plate 28A overlies the lower sandwich plate 28B between the protrusion strips 28E. The protrusion strips 28E protrude upward relative to the upper sandwich plate 28A such that the upper sandwich plate 28A and the protrusion strips 28E of the lower sandwich plate 28B define a groove shape. In the heat conduction plate 28, as shown in the cross-sectional views of FIGS. 20 through 23, the protrusion strips 28E and the upper surface of the upper sandwich plate 28A are in contact with or close to the battery surface, and thus, the battery temperature is detected.

The heat conduction plate 28 is formed by stamping and bending one metal sheet. The heat conduction plate 28 formed of one metal sheet is processed to provide a shape with the upper and lower sandwich plates 28A and 28B, the elastic connection arm 28C, the interlock portion 28D, and the elastic legs 29 connected to each other. The metal sheet is formed in a shape that allows the elastic connection arm 28C to connect the upper and lower sandwich plates 28A and 28B, and additionally is stamped into a shape that connects the protrusion strips 28E and the elastic legs 29 to the lower sandwich plate 28B at its both sides, and thus, the heat conduction plate 28 of the figures is formed.

Figure 22:
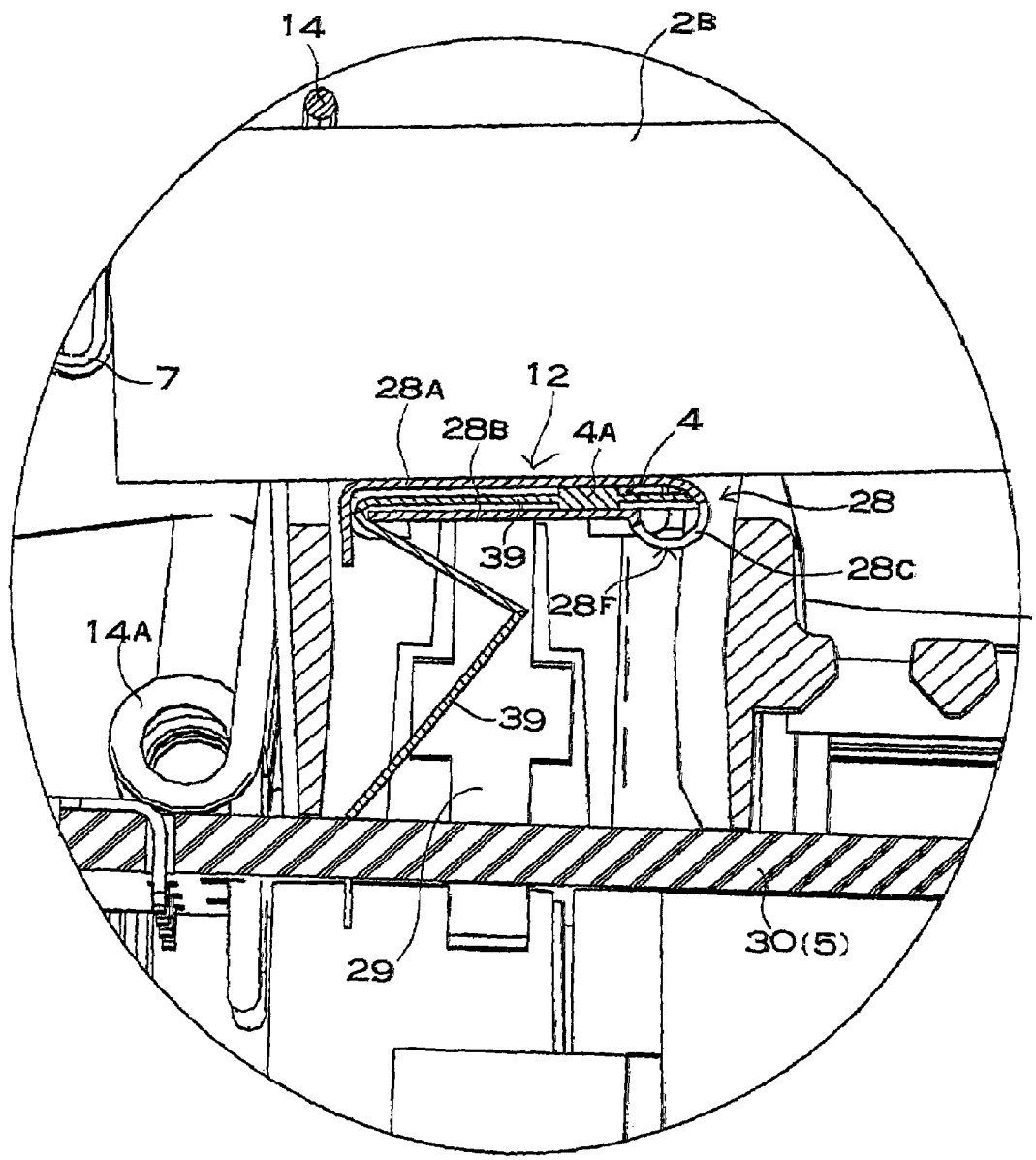
FIG. 22 is a longitudinal cross-sectional view of the charger shown in FIG. 21.

The elastic connection arm 28C is composed of two rows of narrow elastic connection arms as shown in FIG. 15 so as to provide an elastically deformable shape. The elastic connection arm 28C has a curved shape with a predetermined radius of curvature as shown in FIGS. 15 and 22, and thus is more deformable. As shown in FIG. 15, in the heat conduction plate 28, a slit 28F splits the elastic connection arm 28C into the two rows of narrow elastic connection arms. The heat conduction plate 28 is provided with the elastic connection arm 28C at the first end side that is the center side of the sandwich plate 28A in the longitudinal direction of the battery 2. However, the opposite end may be defined as the first end side. In addition, in the heat conduction plate 28, the ends in the longitudinal direction of battery (battery-extending direction) are defined as the first and second end sides, but the ends in the lateral direction (horizontal direction perpendicular to the above battery-extending direction) can be defined as the first and second end sides.

Figure 24:
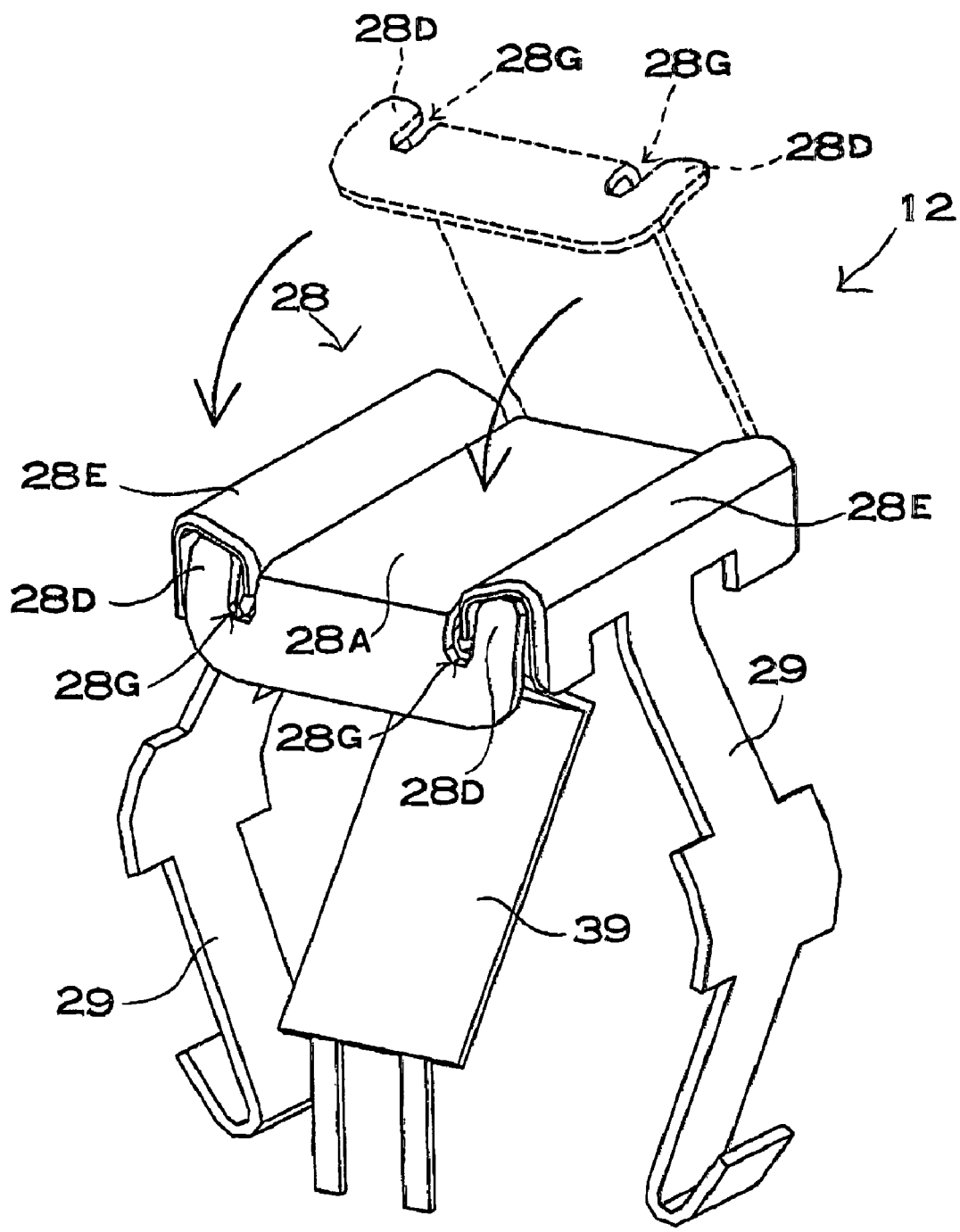
FIG. 24 is an enlarged perspective view of the temperature detection portion.

The upper sandwich plate 28A of the heat conduction plate 28 of the figures is provided with the interlock portions 28D at its both sides. The upper sandwich plate 28A has a fore end that is bent in an L-shape and is provided cut-off portions 28G in the both sides to form the interlock portions 28D outside of the cut-out portions 28G. The interlock portions 28D have fore ends that are bent so as to tilt toward the elastic connection arm 28C. In other words, the interlock portions 28D have fore ends that tilt toward the elastic connection arm 28C relative to the vertical direction after assembly is completed. The interlock portions 28D interlock with the inner surfaces of the protrusion strips 28E provided in the lower sandwich plate 28B at its both sides. Accordingly, the interlock portion 28D has a shape that allows the interlock portion 28D to be guided in the inner surface of the protrusion strip 28E of the lower sandwich plate 28B. In other words, the interlock portion 28D has an exterior shape that is smaller than the interior shape of the protrusion strip 28E. As shown in FIG. 24, the interlock portion 28D that is bent in a tilt position interlocks with the inner surface of the protrusion strip 28E when the upper and lower sandwich plates 28A and 28B come close to each other. When the upper sandwich plate 28A pivots in the direction shown by the arrows and moves closer to the lower sandwich plate 28B, after being elastically deformed and moving over the ends of the protrusion strips 28E, the interlock portions 28D are guided into and interlock with the inner surfaces of the protrusion strips 28E. The protrusion strip 28E protrudes to a position where the fore end of the interlock portion 28D can interlock with its end.

In the structure where the upper sandwich plate 28A is provided with the interlock portions 28D at its both sides as mentioned above, it is possible to ensure stable connection between the upper and lower sandwich plates 28A and 28B. However, in the charger according to the present invention, a structure of the interlock portion 28D that interlocks the upper and lower sandwich plates 28A and 28B is not limited to the aforementioned mechanism. Though not illustrated, the upper and lower sandwich plates 28A and 28B can be connected to each other so as not to be opened by one interlock portion located in a central part of the bent portion, or interlock portions provided to the lower sandwich plate. Alternatively, a penetrating hole can be provided to one of the sandwich plates, and the upper and lower sandwich plates 28A and 28B can be interlocked by inserting an interlock portion into the penetrating hole.

As for the heat conduction plate 28, the sandwich plate 28B that has the elastic legs 29 connected thereto is formed by cutting one sheet of elastically deformable metal plate. The elastic legs 29 are located at both sides of the sandwich plate 28B. As for the heat conduction plate 28, the sandwich plate 28B can be pressed toward the battery surface in a good lateral balance. The reason is that the elastic legs 29 at both sides press the sandwich plate 28B toward the battery surface. The heat conduction plate 28 including the elastic legs 19 is shown in FIGS. 14, 15, 20, 21 and 24. The lower sandwich plate 28B of the heat conduction plate 28 of these figures is provided with the elastic legs 29 connected thereto at its both sides. Lower ends of the pair of elastic legs located at the both sides of the sandwich plate 28B are connected to a fastener plate 30. The fastener plate 30 is the circuit board 5. However, the circuit board 5 does not always serve as the fastener plate, but the fastener plate may be a base plate made of plastic, for example, though not illustrated.

Figure 20:
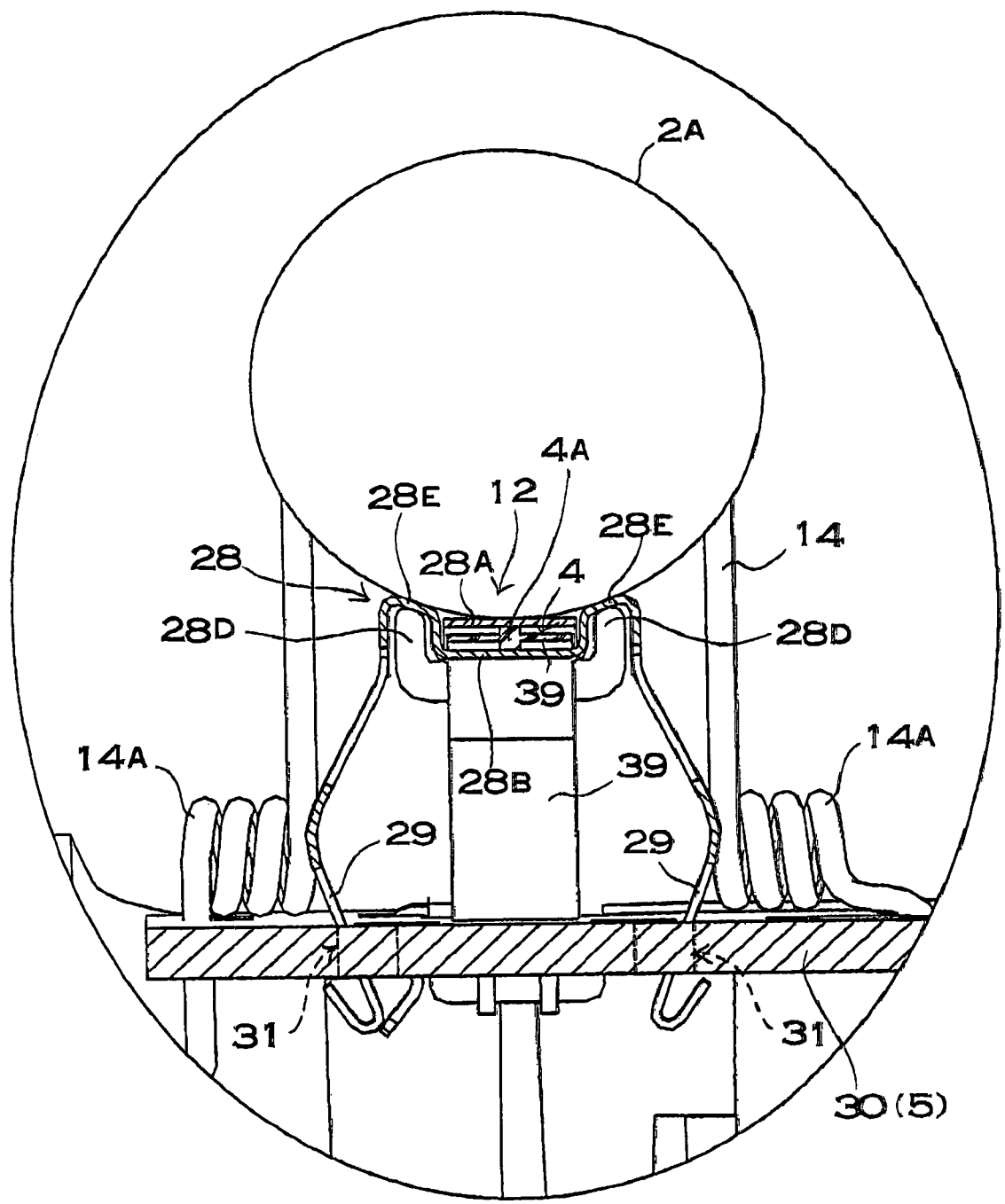
FIG. 20 is a cross-sectional view showing a state where a battery temperature of a AA battery is detected by the temperature detection portion.
Figure 21:
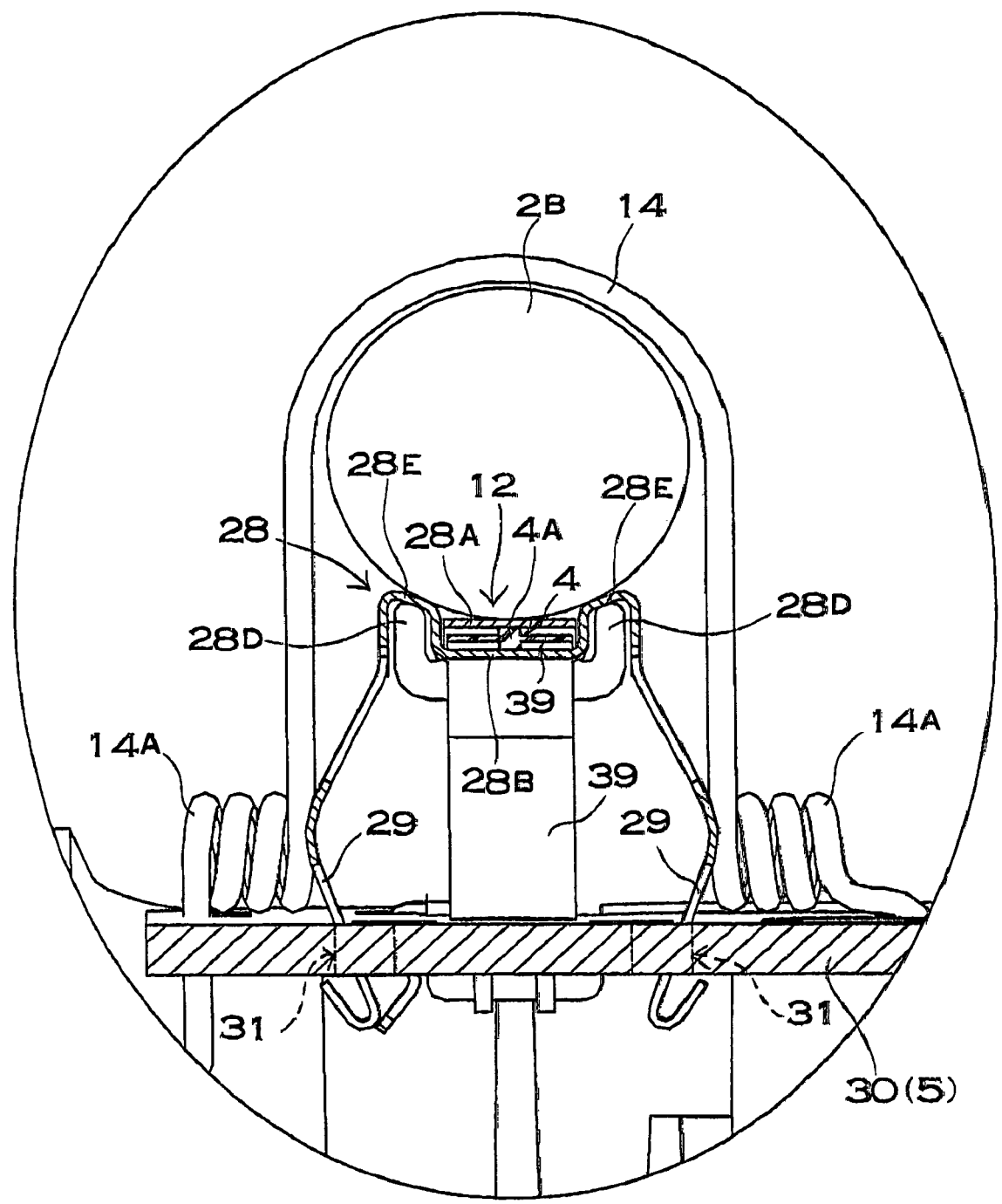
FIG. 21 is a cross-sectional view showing a state where a battery temperature of a AAA battery is detected by the temperature detection portion.

The fastener plate 30 is provided with penetrating holes that open to connect the lower ends of the pair of elastic legs 29. The elastic legs 29 are inserted into the penetrating holes 31 and are connected to the fastener plate 30. As shown in FIGS. 15, 20 and 21, the elastic legs 29 are inserted into the penetrating holes 31 so as to extend upward and downward relative to the fastener plate 30. The elastic legs have lower ends that are bent outwardly so as not to drop off from the penetrating holes 31 of the fastener plate 30. The elastic legs can have the lower ends that are bent inwardly so as not to drop off and can be connected to the fastener plate.

As for the heat conduction plate 28, the elastic legs 29 move upward and downward of the fastener plate 30, and elastically press the sandwich plates 28A and 28B toward the battery surface. To achieve this, the pair of elastic legs 29 shown in the figures tilt so as to move gradually away from each other as they extend upwardly from the penetrating holes 31. As for the elastic legs 29 shown in FIGS. 20 and 21, the elastic leg 29 on the left side as viewed in the figures is bent in a less-than sign shape, and the elastic leg 29 on the right side is bent in a greater-than sign shape, and thus their interval (spacing) at the middle is wider. Alternatively, as for the elastic legs 29, the elastic leg on the right side can be bent in a less-than sign shape, and the elastic leg on the left side can be bent in a greater-than sign shape. In this case, they tilt so as to move gradually closer to each other as they extend upwardly from the penetrating holes.

The elastic legs 29 of the figures are biased such that the interval between their lower ends is elastically wider and upwardly press the sandwich plate 28B. The elastic legs 29 that elastically open such that their interval is wider are biased in a direction that they drop off, and elastically and upwardly press the sandwich plate 28B. When the sandwich plate 28B is pressed toward the battery surface, the elastic legs 29 that elastically open such that their interval is wider are pressed into the penetrating holes 31 such that their interval is narrower. Since the pair of elastic legs 29 are elastically biased such that their interval is wider, the elastic legs 29 that are pressed into the penetrating holes 31 of the fastener plate 30 elastically open and thus are pressed from the fastener plate 30.

Since the elastic legs 29 of the aforementioned structure move upward and downward of the fastener plate 30, and press the sandwich plate 28B toward the battery surface, the sandwich plate 28B can be elastically pressed toward the battery surface at a large vertical stroke of the sandwich plate 28B. As a result, there is a feature that ensures stable pressure of the sandwich plates 28A and 28B is applied toward the battery surface and accurate detection of the battery temperature can be achieved.

In addition, since the lower ends of the elastic legs 29 can be inserted into the penetrating holes 31 of the fastener plate 30 and are connected to the fastener plate 30, there is also a feature that can provide simple and easy connection to the fastener plate 30. Additionally, since the lower ends of the elastic legs 29 can be pulled out and removed from the penetrating holes 31 of the fastener plate 30, the heat conduction plate 28 can easily be replaced.

Figure 23:
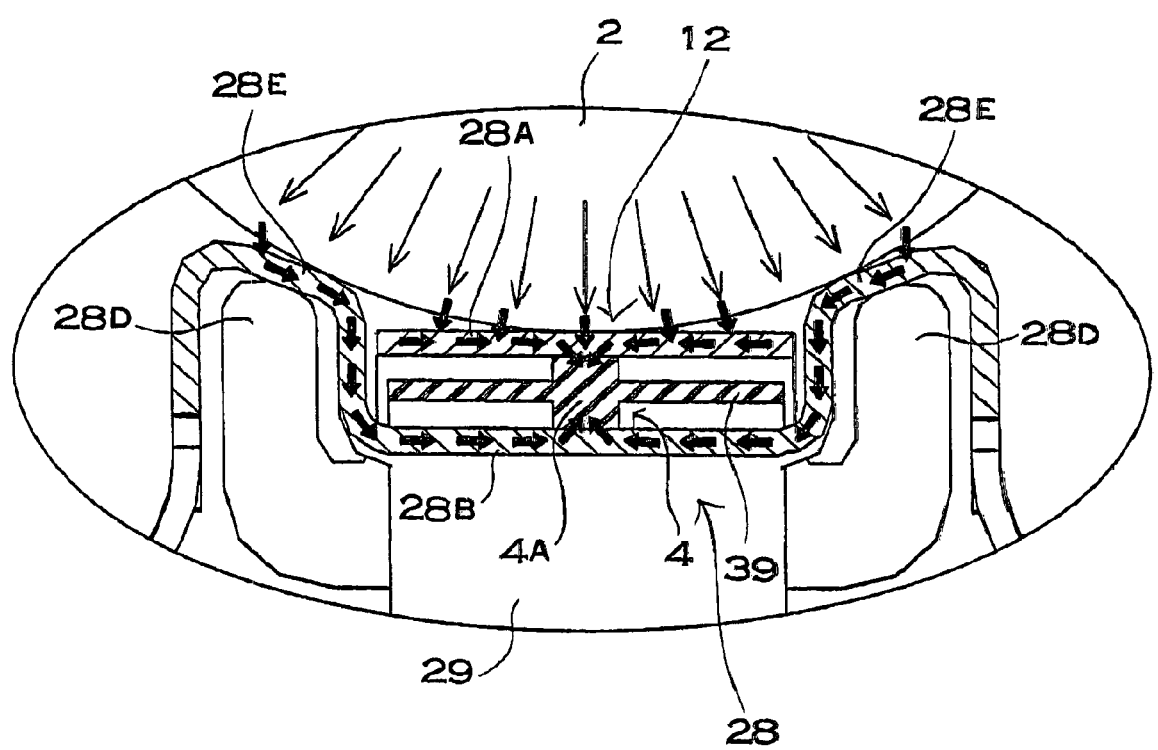
FIG. 23 is an enlarged cross-sectional view showing a state where a battery temperature is detected by a temperature sensor.

In the aforementioned temperature detection portion 12, as shown by arrows in FIG. 23, heat from the battery 2 is conducted to the temperature sensor 4 through the sandwich plates 28A and 28B. Particularly, since the sandwich plates 28A and 28B are in elastic contact with the surface of the battery 2, heat from the battery 2 is effectively conducted. The temperature sensor 4 is sandwiched between the sandwich plates 28A and 28B, and heat from the sandwich plates 28A and 28B is effectively conducted. The lower sandwich plate 28B of the heat conduction plate 28 is provided with the protrusion strips 28E at its both sides. The surfaces of the protrusion strips 28E are in contact with the battery surface. In the lower sandwich plate 28B having the protrusion strips 28E that are in contact with the battery surface, heat from the battery 2 is effectively conducted to the temperature sensor 4. In addition, the central part of the upper sandwich plate 28A can be also in contact with the battery surface. In the upper sandwich plate 28A, heat of the battery 2 is effectively conducted to the temperature sensor 4 located on its lower surface.

Along the aforementioned path, as for the charger in which heat of AA battery 2A or AAA battery 2B can effectively conducted to the temperature sensor 4, heat of the battery 2 is effectively conducted to the temperature sensor 4 through the sandwich plates 28A and 28B. In addition, the temperature sensor 4 is not in contact with and is not cooled by air. Additionally, air does not flow between the battery 2 and each of the sandwich plates 28A and 28B of the heat conduction plate 28, and does not cool the sandwich plates 28A and 28B, and thus, heat from the battery 2 is effectively conducted to the temperature sensor 4 through the sandwich plates 28A and 28B. Accordingly, since heat from the battery 2 is effectively conducted to the temperature sensor 4 through the sandwich plates 28A and 28B, and additionally a cooling effect on the sandwich plates 28A and 28B, and the temperature sensor 4 by air can be small, it is possible to accurately detect the temperature of AA battery 28A or AAA battery 28B with high accuracy and with a small time delay by the temperature sensor 4. In the case where the AAA battery 2B, which is narrower than the AA battery 2A, is mounted, it is in contact with the central part of the upper sandwich plate 28A. The AA battery 2A is in contact with the protrusion strips 28E of the lower sandwich plate 28B. On the other hand, in the case of the AAA battery 2B, the surface of the battery 2 is in contact with the central part of the upper sandwich plate 28A.

The charger according to the present invention includes the socket 33 (see FIG. 13) for connection of the external power line 32, and four LEDs 34 corresponding to the batteries that emit light for displaying charge conditions when charging the batteries.

The charge circuit detects the battery temperature by the sensor 4 and controls an average charge current so as to hold the battery temperature at a predetermined hold temperature, and thus charges the battery while holding the battery temperature in the predetermined hold temperature. This charger has a feature that can charge the battery 2 in a very short time. Particularly, both the AA battery 2A and the AAA battery 2B are charged while being held at the predetermined hold temperature, and thus, both the AA battery 2A and the AAA battery 2B can be charged in a short time.

Figure 25:
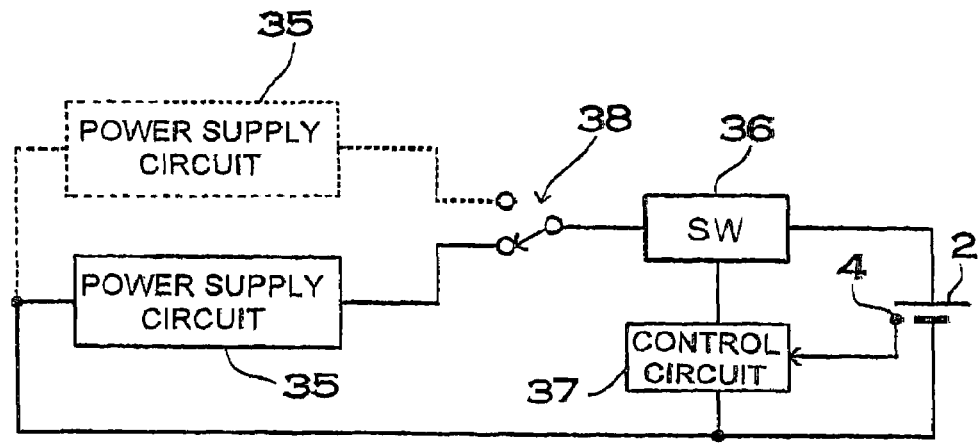
FIG. 25 is a circuit diagram showing an exemplary charge according to one embodiment of the present invention.

FIG. 25 shows the charge circuit. The charge circuit includes a power supply circuit 35 that supplies a charge current to the battery 2 and charges it, a switching element 36 that is connected between the power supply circuit 35 and the battery 2 and adjusts an average charge current for the battery 2, a control circuit 37 that switches the switching element 36 for adjustment of charge current, and the temperature sensor 4 that detects the battery temperature and provides a temperature signal to the control circuit 37.

Figure 26:
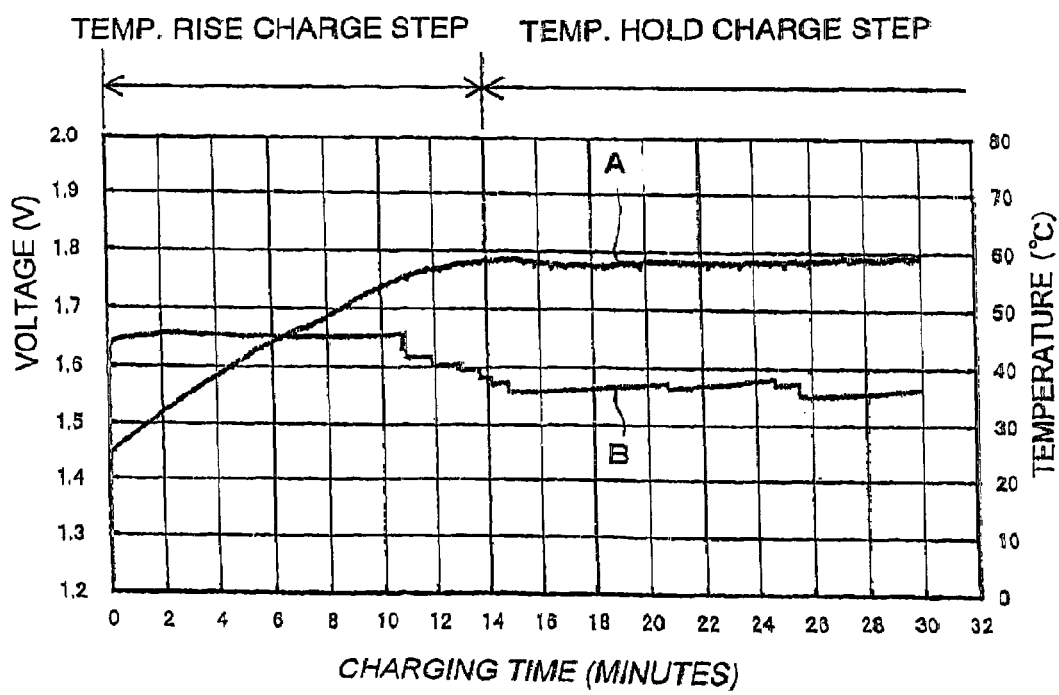
FIG. 26 is a graph showing a temperature characteristic and a voltage characteristic in the case where a battery is charged by the charge according to the one embodiment of the present invention.

FIG. 26 is a graph showing a battery temperature rise characteristic and a battery voltage variation characteristic when the charge circuit charges the battery 2. In FIG. 26, a curve A shows the battery temperature rise characteristic, while a curve B shows the battery voltage variation characteristic. As shown in this figure, in the charge circuit of FIG. 25, the slope of battery temperature rise does not decrease in full charge, but the battery temperature rises to a predetermined temperature in an initial temperature rise charge step where the battery starts to be charged, after that the battery is charged while the battery temperature is held at the predetermined hold temperature in a temperature hold charge step. Accordingly, a large amount of current is initially supplied, and thus increases the battery temperature. In other words, the battery 2 is charged with a large amount of current to the extent that increases the battery temperature. In this case, although the battery 2 is charged with a large amount of current, the battery temperature rises too high. For this reason, its battery performance does not deteriorate, and the battery can be charged to a large amount of capacity within this period.

In a state where the switching element 36 is ON, the power supply circuit 35 has an output that charges the battery 2 at a large amount of current, such as an average current of 1.5 C to 10 C, preferably 2 C to 8 C, and more preferably 2 C to 5 C. The power supply circuit can be an adaptor that is separate from the control circuit and can be connected to the control circuit through a lead line. The power supply circuit can be accommodated in the case same as the control circuit. Since charge capacities of the AA battery 2A and the AAA battery 2B are different, they are charged with their optimal currents.

In the charge circuit, as shown in FIG. 25, a plurality of power supply circuits 35 can be switched, thus, the battery 2 is charged. The plurality of power supply circuits 35 are connected to the switching element 36 via a switching switch 38. The switching switch 38 switches the power supply circuits 35 to charge the battery 2. The plurality of power supply circuits 35 have different peak currents in a pulse charge manner. Even in the case of the same average charge current, if a peak current is large in pulse charge, the battery generates a large amount of heat. For this reason, in the case where the battery 2 is charged with a large amount of current, if the switching switch is switched to the power supply circuit 35 that can provide a small peak current to charge the battery 2, the battery generates a small amount of heat. Therefore, it is possible to charge the battery with a larger amount of average charge current with a small battery temperature rise.

The switching element 36 is a transistor or FET. Switching is performed on the switching element 36 by the control circuit 37, and thus, the battery 2 is charged in a pulse charge manner. The battery 2 is charged with a large amount of current initially until the battery temperature rises to the predetermined rise temperature or the predetermined hold temperature as a predetermined temperature while switching is not performed on the switching element 36, and the switching element 36 is held in the ON state. In this case, the battery is charged in a constant current charge manner. The battery 2 can be charged with a pulse current (a large amount of current with a large average current value) initially until the battery temperature rises to the predetermined rise temperature or the predetermined hold temperature as a predetermined temperature while ON/OFF switching is performed on the switching element 36 at a predetermined duty ratio.

The switching element 36 adjusts an average charge current for charging the battery 2 in a pulse charge manner based on a duty ratio of ON/OFF switching. A duty ratio (Q) in pulse charge is a ratio between periods in ON and OFF states of the switching element 36. Thus, the duty ratio (Q) is represented by the following equation.

$$Q = t_{on}(t_{on} + t_{off})$$

Accordingly, when the duty ratio of ON/OFF switching for the switching element 36 is small, its average charge current is small, on the contrary, when the duty ratio is large its average charge current is large.

The control circuit 37 detects the battery temperature based on the signal provided from the temperature sensor 4, and performs ON/OFF switching on the switching element 36 at a predetermined duty ratio. The duty ratio of ON/OFF switching for the switching element 36 is small when the battery temperature is high, and is large when the battery temperature is low, and thus, the battery temperature is held at the predetermined hold temperature. As shown in FIG. 26, at the beginning of charge the battery temperature is initially low, and thus, the battery is charged with a large amount of current until the battery temperature rises to the predetermined rise temperature. After that, the control circuit 37 controls the duty ratio of the switching element 36 such that the temperature of the battery 2 is held at the in the predetermined hold temperature. The control circuit 37 performs ON/OFF switching on the switching element 36 at a period of 1 msec to 10 sec, preferably 10 msec to 2 sec, and more preferably 50 msec to 2 sec.

When the battery temperature detected by battery sensor 4 is lower than the predetermined hold temperature, the control circuit 37 increases the duty ratio and increases an average charge current for charging the battery 2 in a pulse charge manner. Thus, the battery temperature rises. When the battery temperature rises to the predetermined hold temperature, the duty ratio of the switching element 36 is controlled such that the battery temperature does not exceed the predetermined hold temperature by reducing the duty ratio and does not decrease from the predetermined hold temperature. The control circuit 37 does not charge the battery 2 with a constant current and does not charge it with a constant voltage. The control circuit 37 controls the duty ratio of the switching element 36 and thus controls an average charge current for charging the battery 2 such that the temperature of the battery 2 describes the curve shown in FIG. 26.

The charge circuit of FIG. 25 charges the battery 2 in the following steps. A charge method for nickel-hydrogen battery is described, but a nickel-cadmium battery can be similarly charged with a different charge current.

Before start of the charging operation, the aforementioned detection circuit 16 detects whether the AA battery 2A or AAA battery 2B is attached in a proper position. After proper attachment of the AA battery 2A or AAA battery 2B is confirmed, the battery is charged in the following steps. Since charge capacities of the AA battery 2A and the AAA battery 2B are different, the battery is charged with a current that is set to the optimal current for its charge capacity.

(1) After proper attachment of the battery 2 to the proper position is confirmed, before start of the charging operation, the charge circuit detects the temperature of the battery 2 to be charged by the temperature detection portion 12. If the detected battery temperature is within a predetermined start temperature range, the control circuit 37 starts the temperature rise charge step. The predetermined start temperature range of the battery 2 for starting the temperature rise charge step is 0 to 40° C., and preferably 10 to 30° C. If the battery temperature is lower or higher than the predetermined start temperature range, normal charge starts while the battery temperature is detected. In the normal charge, a charge current is limited to 1 C or less, and a battery voltage is detected. Then full charge is completed when the battery voltage reaches the peak voltage or based on detection of ΔV.

In addition, a remaining capacity of the battery 2 is detected based on its voltage. The reason is that if a battery close to full charge is charged in the following temperature rise charge step, it is over-charged, and thus, its battery performance deteriorates. A battery with a battery voltage lower than a predetermined voltage is detected as a small remaining capacity. In this case, the battery is charged in the temperature rise charge step. A battery with a battery voltage higher than a predetermined voltage is detected as a large remaining capacity. In this case, it is detected that charge in the temperature rise charge step causes an over-charge. Thus, the normal charge starts.

Additionally, when charging starts, an internal resistance of the battery 2 is detected. If the internal resistance is higher than a predetermined resistance, the battery is charged in the normal charge without going to the temperature rise charge step. After the normal charge, if the internal resistance becomes lower than the predetermined resistance, the temperature rise charge step may start.

(2) When the temperature of the battery 2 is within the predetermined start temperature range, and the battery voltage is lower than a predetermined hold voltage, the temperature rise charge step starts. In the temperature rise charge step, the battery is charged with a large amount of current such that the battery temperature rises at a predetermined temperature slope. In this step, the battery is charged with an average charge current such that the battery temperature rises at a rise slope of about 3° C./min. In the case of AA nickel-hydrogen battery with a normal capacity of 2100 mAh, an average charge current of 2 C to 3 C gives a temperature rise slop of about 3° C./min. However, in this step, the battery can be charged with an average charge current such that the temperature rises at a rise slope of about 1° C./min to 5° C./min. In addition, an average charge current for the battery 2 can be 1.5 C to 10 C.

In this case, when the battery can be charged with a predetermined average charge current (e.g., 2.5 C, in this case, a temperature rise slope is normally 2° C./min to 3° C./min), if the temperature rise slope is detected higher than or equal to a predetermined temperature rise slope (e.g., 5° C./min), or if −ΔV (e.g., 60 mV) is detected, the charge is completed on presumption that the battery is fully charged to prevent over-charge. Although a remaining capacity is detected by measuring the battery voltage before start of charge to prevent over-charge by charging a battery with a large remaining capacity in the normal charge as mentioned above, in the case of detection of a remaining capacity based on the battery voltage, the battery voltage does not always correspond to the remaining capacity. Therefore, this step prevents over-charge of battery. That is, even if a battery that actually has a large remaining capacity but gives a low battery voltage is charged with a large amount of current in the temperature rise charge step based on the detection that its remaining capacity is small, when the temperature rise slope is detected higher than or equal to the predetermined temperature rise slope or when $-\Delta V$ is detected, the charge is completed on presumption that the battery is fully charged to prevent over-charge as mentioned above.

In this step, the switching element 36 is held in ON state, or the duty ratio of the switching element 38 is set to high, thus, the average charge current is set within the aforementioned range. When the battery temperature becomes the predetermined rise temperature and then is close to the predetermined hold temperature, for example, in the case where the predetermined hold temperature is set to 57 to 60° C., when the battery temperature is close to the predetermined rise temperature (e.g., about 55° C.) and it is then detected that the battery temperature becomes the predetermined rise temperature (e.g., about 55° C.), the average charge current is set to low, thus, the temperature rise slope of the battery is small.

In FIG. 26, when the battery temperature becomes the predetermined rise temperature of about 55° C., and it is then detected that that the battery temperature becomes this temperature, the average charge current is set to low, and thus, the battery temperature is closer to the predetermined hold temperature at the small temperature rise slope (the temperature rise charge step shown in FIG. 26). The average charge current is controlled by reducing the ON/OFF duty ratio of the switching element 36. In a control method where the average charge current is reduced when the temperature of battery 2 is close to the predetermined hold temperature and becomes the predetermined rise temperature, an overshoot due to excessive battery temperature exceeding the predetermined hold temperature is prevented. Therefore, it is possible to effectively prevent the battery 2 from deteriorating due to a high temperature problem. However, the battery 2 can be charged with the average charge current such that the temperature of the battery 2 rises at a predetermined temperature slope until the temperature of the battery 2 reaches the predetermined hold temperature.

In addition, in the temperature rise charge step, if the battery temperature does not reach a predetermined temperature (e.g., the predetermined rise temperature, or the predetermined hold temperature discussed later) within a predetermined period (e.g., 15 minutes), the battery can be charged with an average charge current to the extent of the temperature hold charge step discussed later (about 1.5 C as an average charge current to the extent of half the average charge current in the temperature rise charge step) similarly to charge control in the temperature hold charge step. Thus, in a battery in low battery temperature (about 0 to 20° C.) before start of charge, a sharp temperature rise can be suppressed. Therefore, it is possible to suppress an adverse influence on the battery.

(3) At the end of the temperature rise charge step, when the battery temperature rises to the predetermined hold temperature, the battery 2 is charged in the temperature hold charge step with the average charge current that is controlled such that the battery temperature is held in the predetermined hold temperature. In the temperature hold charge step, the control circuit 37 controls the duty ratio of ON/OFF switching for the switching element 36, and thus adjusts the average charge current for pulse charge to hold the battery temperature in the predetermined hold temperature. In this step, the temperature sensor 4 detects the battery temperature, and provides the temperature signal to the control circuit 37. The control circuit 37 controls the duty ratio of ON/OFF switching for the switching element 36 based on the detected battery temperature. When the battery temperature is high, the duty ratio is reduced, thus the average charge current is reduced to reduce the battery temperature. On the other hand, when the battery temperature is low, the duty ratio is increases, thus the average charge current is increased to increase the battery temperature. Accordingly, the battery is charged while the battery temperature is held in the predetermined hold temperature. In the temperature hold charge step, the battery temperature is preferably held at a constant temperature (e.g., 58° C.).

The predetermined hold temperature is set to a temperature not higher than a temperature that causes an adverse influence on or performance deterioration of battery and in proximity to the maximum temperature. In addition, the predetermined hold temperature is set to the extent that a temperature that does not cause a problem for a user and to the extent that the battery 2 in high temperature does not gives the user an abnormal sense. Such a predetermined hold temperature is set to substantially 70° C. at the maximum as an upper limit, preferably not higher than 65° C., and more preferably not higher than 63° C. The range of the predetermined hold temperature is set to preferably between 50 and 65° C., more preferably between 53 and 61° C., and most preferably between 57 and 60° C.

In order to hold the battery temperature in the predetermined hold temperature, control in this embodiment is performed as follows. First, in the predetermined hold temperature, a control regulation temperature is set to a predetermined temperature (e.g., 58° C.). For every 1° C. rise of the detected battery temperature relative to the control regulation temperature, for example, the average charge current is reduced in stages. On the other hand, for every 1° C. drop of the detected battery temperature relative to the control regulation temperature, the average charge current is increased in stages. The battery is charged while the battery temperature is held in the predetermined hold temperature based on this control.

Instead of the aforementioned control regulation temperature, a predetermined temperature range (e.g., 57 to 59° C.) may be set as a control regulation temperature. For every 1° C. rise of the detected battery temperature relative to the control regulation temperature, for example, the average charge current is reduced in stages. On the other hand, for every 1° C. drop of the detected battery temperature relative to the control regulation temperature, the average charge current is increased in stages. The battery is charged while the battery temperature is held in the predetermined hold temperature based on this control. In the temperature hold charge step, the charge is completed on presumption that the battery is fully charged when a predetermined temperature rise slope (e.g., 2° C./min) or more, a predetermined battery temperature (e.g., 62° C.) or more, or $-\Delta V$ (e.g., 60 mV) is detected.

In the temperature hold charge step, when the battery 2 is close to its full-charge state, even if the average charge current is small, the battery temperature has a strong tendency to rise. Accordingly, when the battery 2 is close to its full-charge state, though the battery temperature rises or tends to rise, the average charge current is reduced such that the battery temperature is held in the predetermined hold temperature. That is, the control circuit 37 controls ON/OFF switching for the switching element 36 such that the duty ratio is very small. For this reason, when the battery 2 is close to its full-charge state, the control circuit 37 sharply reduces the average charge current. As a result, in the temperature hold charge step, even though the full-charge state of the battery 2 is not detected to stop charging it, the average charge current is sharply reduced, thus it is possible to prevent over-charge. In the temperature hold charge step according to this embodiment, a timer ends the charge. The timer is set to a sufficient period that can charge the battery 2 such that the battery 2 reaches its full-charge state (e.g., about 30 minutes). In this embodiment, since the battery temperature rises when the battery is close to its full-charge state, the average charge current is reduced as mentioned above. Therefore, if the reduced current is detected, the charge stops even before the set period of the timer elapses. In addition, during charge of the battery 2 in the temperature hold charge step, when the internal resistance of the battery 2 is detected, if the internal resistance is higher than the predetermined resistance, the battery 2 is charged with a small charge current in the normal charge. In the normal charge, the temperature of the battery 2 is also adjusted so as not to be higher than the predetermined hold temperature.

(4) In the aforementioned temperature rise charge step and temperature hold charge step, the battery 2 reaches almost its full-charge state, but does not completely reach its full-charge state. After the temperature hold charge step, the battery 2 can completely reach its full-charge state in the normal charge.

In the aforementioned charge method, the battery 2 is charged in a pulse charge manner in the temperature rise charge step and the temperature hold charge step, the charge circuit is not always required to adjust the average current by controlling the duty ratio in pulse charge. For example, in the temperature rise charge step and the temperature hold charge step, the charge circuit can control a charge current that continuously charges the battery such that its average charge current is set to a predetermined current.

The aforementioned charge circuit charges the battery while holding the battery temperature in the predetermined temperature by specifying the average charge current. However, the charge circuit can charge the battery 2 in a constant charge manner, or can detect the peak voltage of the battery 2 while charging it with a constant current and stop charging it based on $\Delta V$ drop detected based on the peak voltage. This charge circuit stops or temporarily stops charging the battery when the battery temperature is higher than a predetermined temperature such that the battery temperature is not higher than the predetermined temperature.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. This application is based on Application No. 2004-253,025 filed in Japan on Aug. 31, 2004, the content of which is incorporated hereinto by reference.

What is claimed is:

1. A battery charger comprising:
a case having a battery pocket that can detachably mount a battery to be charged;
a temperature detection portion that contacts the battery mounted in the battery pocket and detects its battery temperature;
a charge circuit that controls charge of the battery based on the battery temperature detected by the temperature detection portion; and
a cooling fan, installed in the case, for blowing air to cool the battery loaded in the battery pocket, wherein:
the temperature detection portion includes a heat conduction plate and a temperature sensor that is fastened to the heat conduction plate, the heat conduction plate is an integral structure formed by stamping and bending a single metal sheet to accommodate AA and AAA batteries
the heat conduction plate includes upper lower sandwich plates that sandwich the temperature sensor, an elastic connection arm that connects a first side of the upper sandwich plate and a first side of the lower sandwich plate, interlock portions located at a second side of the upper sandwich plate, and protrusion strips that upwardly protrude from opposite third and fourth sides of the lower sandwich plate,
the interlock portions are engaged with inner surfaces of the protrusion strips so as to couple the second sides of the upper and lower sandwich plates, and the upper sandwich plate is located between the protrusion strips, and
the protrusion strips and the upper surface of the upper sandwich plate are in contact with or close to the battery surface and thus, the upper and lower sandwich plates sandwich and fasten the temperature sensor such that the temperature sensor is fastened to the heat conduction plate for detecting the battery temperature.

2. The battery charger according to claim 1, wherein the temperature sensor includes a temperature detection element that is fastened to a flexible substrate.

3. The battery charger according to claim 1, wherein the heat conduction plate of the temperature detection portion is an elastically deformable metal plate, and has an elastic leg that elastically presses the sandwich plates toward a battery surface.

4. The battery charger according to claim 1, wherein one of the sandwich plates has a pair of elastic legs for elastically pressing the sandwich plates toward a surface of the battery, and the elastic legs extend from opposite sides of the one sandwich plate.

5. The battery charger according to claim 1, wherein the elastic connection arm has a curved shape with a predetermined radius of curvature.

6. The battery charger according to claim 1, wherein a slit splits the elastic connection arm into two parts.

7. A battery charger comprising:
a case having a battery pocket that can detachably mount a battery to be charged;
a temperature detection portion for contacting the battery mounted to the battery pocket and detecting its battery temperature;
a charge circuit for controlling charge of the battery based on the battery temperature detected by the temperature detection portion; and
a cooling fan installed in the case to blow air for cooling the battery loaded in the battery pocket, wherein:
the temperature detection portion includes a heat conduction plate and a temperature sensor that is fastened to the heat conduction plate, the heat conduction plate is an integral structure formed by stamping and bending a single metal sheet to accommodate AA and AAA batteries
the heat conduction plate includes upper and lower sandwich plates that sandwich the temperature sensor, an elastic connection arm that connects the upper and lower sandwich plates at first ends thereof, interlock portions that are located at a second end of the upper sandwich plate opposite to the first end thereof, and protrusion strips that upwardly protrude at opposites sides of the lower sandwich plate,
the elastic connection arm connects the first ends of the upper and lower sandwich plates, and the interlock portions are engaged with inner surfaces of the protrusion strips so as to couple the second ends of the upper and lower sandwich plates, and the upper sandwich plate is located between the protrusion strips, the protrusion strips and the upper surface of the upper sandwich plate are in contact with or close to the battery surface and thereby the upper and lower sandwich plates sandwich and fasten the temperature sensor such that the temperature sensor is fastened directly to the sandwich plates of the heat conduction plate, the heat conduction plate of the temperature detection portion is an elastically deformable metal plate, and has an elastic leg that elastically presses the sandwich plates toward a battery surface, one of the sandwich plates has a pair of the elastic legs that are connected to opposite sides of the one sandwich plate, and the battery charger further comprises a fastener plate that is connected to the elastic legs, wherein the fastener plate has a pair of penetrating holes removably receiving the pair of elastic legs, wherein the pair of elastic legs tilt so as to move gradually away from or closer to each other as they extend upwardly from the penetrating holes.

8. A battery charger comprising:

a case having a battery pocket that can detachably mount a battery to be charged;

a temperature detection portion for contacting the battery mounted to the battery pocket and detecting its battery temperature;

a charge circuit for controlling charge of the battery based on the battery temperature detected by the temperature detection portion; and a cooling fan installed in the case to blow air cooling loaded in the battery pocket, wherein:

the temperature detection portion includes a heat conduction plate and a temperature sensor fastened to the heat conduction plate, the heat conduction plate the heat conduction plate is an integral structure formed by stamping and bending a single metal sheet to accommodate AA and AAA batteries includes a pair of upper and lower sandwich plates that sandwich the temperature sensor, an elastic connection arm connecting first ends of the upper and lower sandwich plates, interlock portions located at a second end of the upper sandwich plate, the interlock portions engaging a second end of the lower sandwich plate thereby coupling the second ends of the sandwich plates and sandwiching the temperature sensor, the elastic connection arm connects the first ends of the upper and lower sandwich plates, and the interlock portions couple the second ends of the upper and lower sandwich plates, and thereby, the temperature sensor is fastened to the sandwich plates of the heat conduction plate, a part of the heat conduction plate that is pressed toward the battery has a groove shape corresponding to a cylindrical battery, the lower sandwich plate is provided with protrusion strips that upwardly protrude at opposite sides of the lower sandwich plate, and the upper sandwich plate is located between the protrusion strips, and the protrusion strips and the upper surface of the upper sandwich plate are in contact with or close to the battery surface, and the interlock portions of the upper sandwich plate interlock with inner surfaces of the protrusion strips of the lower sandwich plate, and the groove shape of the heat conduction plate is defined by upper surfaces of the protrusion strips and an upper surface of the upper sandwich plate.

9. The battery charger according to claim 8, wherein the upper sandwich plate has a fore end that is bent in an L-shape and is provided cut-off portions to form the interlock portions outside of the cut-off portions.

10. The battery charger according to claim 9, wherein the interlock portions have fore ends that tilt toward the elastic connection arm relative to the vertical direction.

11. The battery charger according to claim 8, wherein the temperature sensor includes a temperature detection element that is fastened to a flexible substrate, and the flexible substrate has a width that allows the flexible substrate to be guided between the protrusion strips provided in the lower sandwich plate at its both sides.

* * * * *